(12) United States Patent
Medasani et al.

(10) Patent No.: US 9,086,484 B2
(45) Date of Patent: Jul. 21, 2015

(54) CONTEXT-BASED TARGET RECOGNITION

(75) Inventors: Swarup S. Medasani, Thousand Oaks, CA (US); Dmitriy Korchev, Irvine, CA (US); Jose M. Molineros, Encino, CA (US); Yuri Owechko, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 215 days.

(21) Appl. No.: 13/173,891

(22) Filed: Jun. 30, 2011

(65) Prior Publication Data

US 2013/0004017 A1 Jan. 3, 2013

(51) Int. Cl.
| | |
|---|---|
| G06K 9/00 | (2006.01) |
| G01S 13/90 | (2006.01) |
| G01S 7/41 | (2006.01) |
| G06K 9/46 | (2006.01) |
| G06K 9/48 | (2006.01) |
| G06K 9/72 | (2006.01) |

(52) U.S. Cl.
CPC ............. G01S 13/9035 (2013.01); G01S 7/412 (2013.01); G06K 9/4604 (2013.01); G06K 9/48 (2013.01); G06K 9/72 (2013.01)

(58) Field of Classification Search
None
See application file for complete search history.

(56) References Cited

U.S. PATENT DOCUMENTS

| | | | |
|---|---|---|---|
| 6,072,889 A * | 6/2000 | Deaett et al. ................. 382/103 |
| 6,578,017 B1 * | 6/2003 | Ebersole et al. ................. 706/3 |
| 7,672,911 B2 * | 3/2010 | Owechko et al. ................. 706/14 |
| 8,155,391 B1 * | 4/2012 | Tang et al. ..................... 382/113 |
| 8,243,997 B2 * | 8/2012 | Davis et al. .................... 382/109 |
| 8,369,622 B1 * | 2/2013 | Hsu et al. ....................... 382/190 |
| 8,437,558 B1 * | 5/2013 | Medasani et al. ............. 382/225 |
| 2004/0263514 A1 * | 12/2004 | Jin et al. ........................ 345/440 |
| 2005/0100220 A1 * | 5/2005 | Keaton et al. ................. 382/191 |
| 2007/0183669 A1 * | 8/2007 | Owechko et al. ............. 382/224 |
| 2007/0183670 A1 * | 8/2007 | Owechko et al. ............. 382/224 |
| 2010/0078561 A1 * | 4/2010 | Gorin .......................... 250/338.5 |
| 2011/0007940 A1 * | 1/2011 | Hamza et al. ................. 382/103 |
| 2011/0075882 A1 * | 3/2011 | Guo et al. ...................... 382/100 |
| 2012/0170805 A1 * | 7/2012 | Brown et al. .................. 382/103 |
| 2012/0224772 A1 * | 9/2012 | Mitchell et al. ............... 382/190 |

FOREIGN PATENT DOCUMENTS

| | | |
|---|---|---|
| CN | 101923575 A | 12/2010 |
| JP | 2008108044 A | 5/2008 |
| JP | 2011034149 A1 | 2/2011 |
| WO | WO01/71577 A2 | 9/2001 |

OTHER PUBLICATIONS

Amberg, V., et al. "Improvement of road extraction in high resolution SAR data by a context-based approach." Geoscience and Remote Sensing Symposium, 2005. IGARSS'05. Proceedings. 2005 IEEE International. vol. 1. IEEE, 2005.*

(Continued)

*Primary Examiner* — Stephen R Koziol
*Assistant Examiner* — Sean Conner
(74) *Attorney, Agent, or Firm* — Yee & Associates, P.C.

(57) ABSTRACT

A method and apparatus for identifying a target object. A group of objects is identified in an image. The group of objects provides a context for identifying the target object in the image. The target object is searched for in the image using the context provided by the group of objects.

13 Claims, 19 Drawing Sheets

(56) References Cited

OTHER PUBLICATIONS

Liu, Z. J., J. Wang, and W. P. Liu. "Building extraction from high resolution imagery based on multi-scale object oriented classification and probabilistic Hough transform." International Geoscience and Remote Sensing Symposium. vol. 4. 2005.*

Pierce, Scott J., and Juan R. Vasquez. "Context aided tracking in aerial video surveillance." SPIE Defense and Security Symposium. International Society for Optics and Photonics, 2008.*

Simonetto, Elisabeth, Hélène Oriot, and Renè Garello. "Rectangular building extraction from stereoscopic airborne radar images." Geoscience and Remote Sensing, IEEE Transactions on 43.10 (2005): 2386-2395.*

Sportouche, Helene, Florence Tupin, and Leonard Denise. "Building extraction and 3D reconstruction in urban areas from high-resolution optical and SAR imagery." Urban Remote Sensing Event, 2009 Joint. IEEE, 2009.*

Wei, Yanfeng, Zhongming Zhao, and Jianghong Song. "Urban building extraction from high-resolution satellite panchromatic image using clustering and edge detection." Geoscience and Remote Sensing Symposium, 2004. IGARSS'04. Proceedings. 2004 IEEE International. vol. 3. IEEE, 2004.*

Lefèvre, Sébastien, and Jonathan Weber. "Automatic building extraction in VHR images using advanced morphological operators." Urban Remote Sensing Joint Event, 2007. IEEE, 2007.*

Aksoy, Selim, H. Gökhan Akçay, and Tom Wassenaar. "Automatic mapping of linear woody vegetation features in agricultural landscapes using very high resolution imagery." Geoscience and Remote Sensing, IEEE Transactions on 48.1 (2010): 511-522.*

Saisan, Payam, Swarup Medasani, and Yuri Owechko. "Multi-view classifier swarms for pedestrian detection and tracking." Computer Vision and Pattern Recognition-Workshops, 2005. CVPR Workshops. IEEE Computer Society Conference on. IEEE, 2005.*

Owechko, Yuri, and Swarup Medasani. "Cognitive swarms for rapid detection of objects and associations in visual imagery." Swarm Intelligence Symposium, 2005. SIS 2005. Proceedings 2005 IEEE. IEEE, 2005.*

Owechko, Yuri, and Swarup Medasani. "A swarm-based volition/attention framework for object recognition." Computer Vision and Pattern Recognition-Workshops, 2005. CVPR Workshops. IEEE Computer Society Conference on. IEEE, 2005.*

Owechko, Yuri, Swarup Medasani, and Narayan Srinivasa. "Classifier swarms for human detection in infrared imagery." Computer Vision and Pattern Recognition Workshop, 2004. CVPRW'04. Conference on. IEEE, 2004.*

S. Kuttikkad, W. Phillips, S. Mathieu-Marni, R. Meth, and R. Chellappa, "Use of context for false alarm reduction in SAR automation target recognition," presented at the Image Understanding Workshop, May 11-14, 1997, New Orleans, La.*

Shorter, Nicholas, and Takis Kasparis. "Automatic vegetation identification and building detection from a single nadir aerial image." Remote Sensing 1.4 (2009): 731-757.*

Novak, Leslie M., Gregory J. Owirka, and Allison L. Weaver. "Automatic target recognition using enhanced resolution SAR data." Aerospace and Electronic Systems, IEEE Transactions on 35.1 (1999): 157-175.*

Manolakis, Dimitris, David Marden, and Gary A. Shaw. "Hyperspectral image processing for automatic target detection applications." Lincoln Laboratory Journal 14.1 (2003): 79-116.*

Steger, "An Unbiased Detector of Curvilinear Structures", IEEE Transactions on Pattern Analysis and Machine Intelligence, vol. 20, No. 2, Feb. 1998, pp. 113-126.

Tupin et al., "Detection of Linear Features in SAR Images: Application to Road Network Extraction", IEEE Transactions on Geoscience and Remote Sensing, vol. 36, No. 2, Mar. 1998, pp. 434-454.

Ferro et al., "An Advanced Technique for Building Detection in VHR SAR Images", pp. 1-12, retrieved May 16, 2011 http://disi.unitn.it/~ferro/images/stories/publications/spie2009_building_detection.pdf.

Felzenszwalb et al., "Efficient Belief Propagation for Early Vision", pp. 1-8, retrieved May 16, 2011 http://www.cs.cornell.edu/~dph/papers/bp-cvpr.pdf.

UK search report dated Nov. 26, 2012 regarding application GB1211615.8, reference NAM/P122633GB00, Applicant The Boeing Company, 6 pages.

* cited by examiner

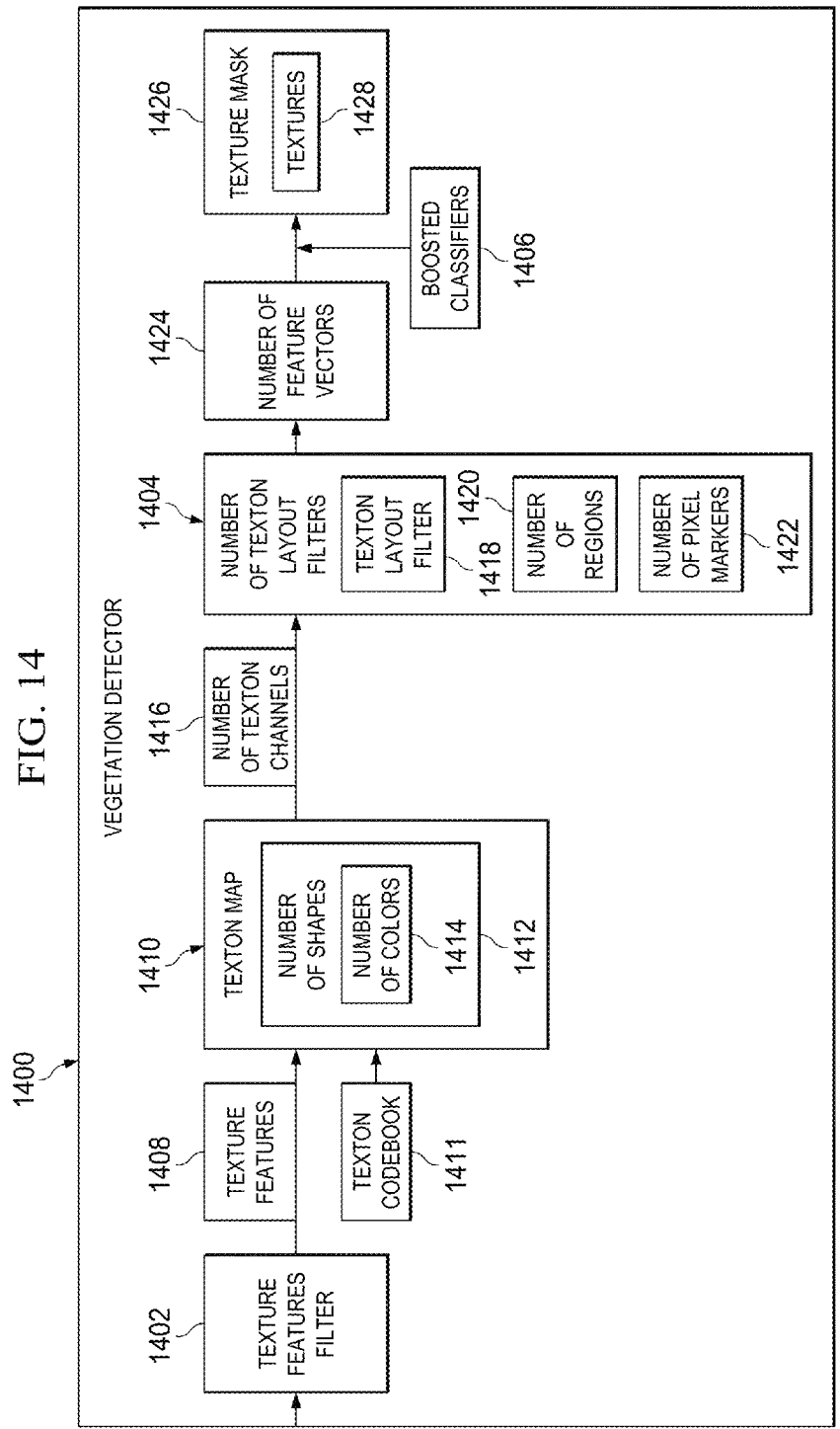

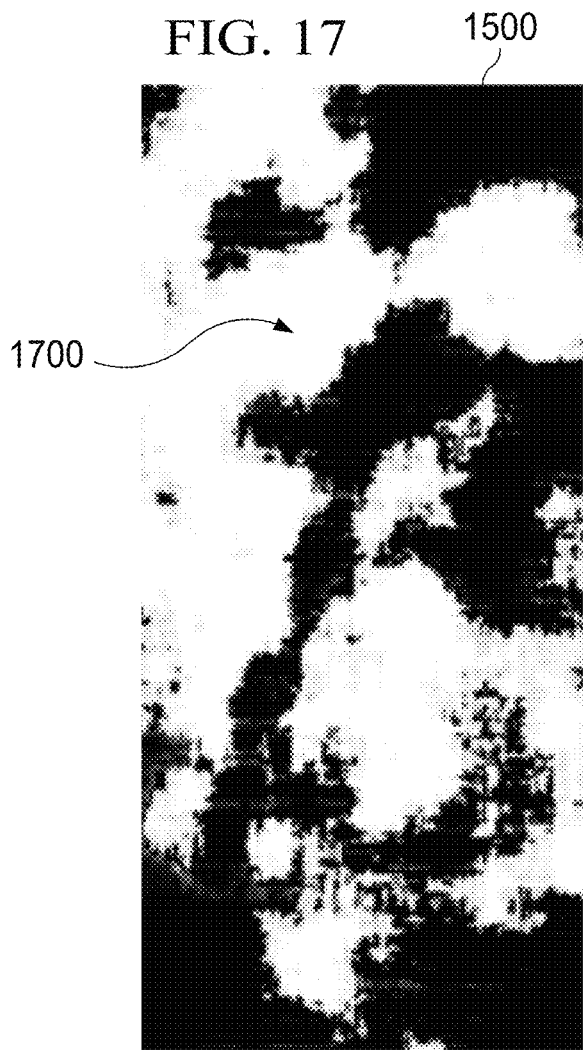

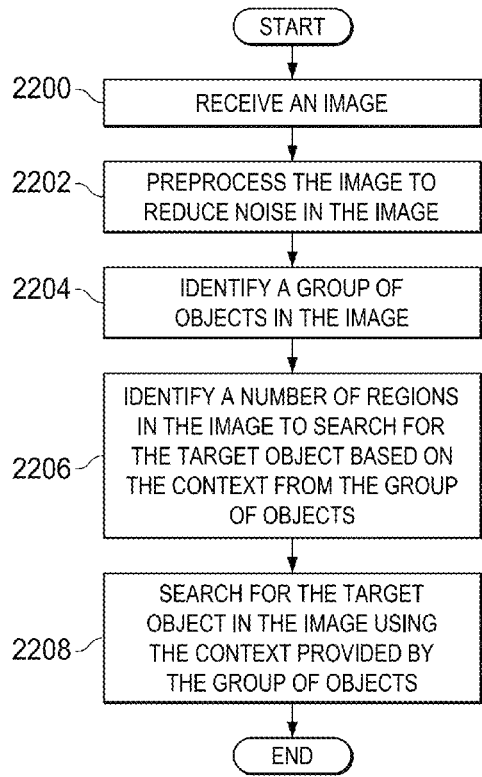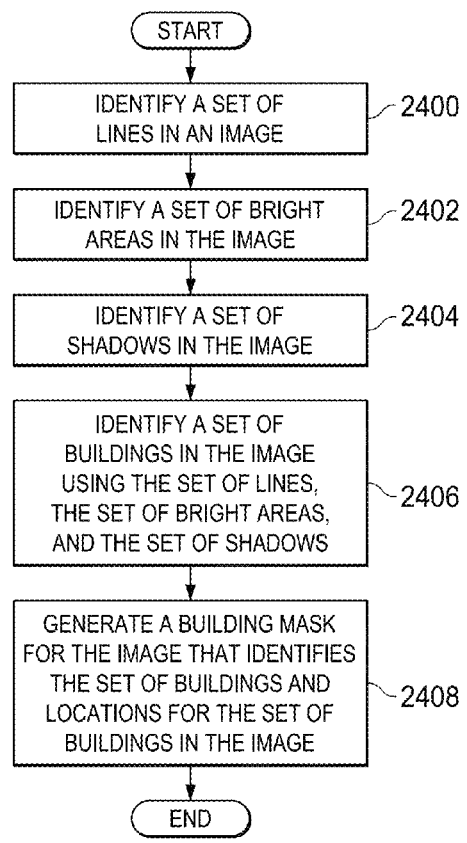

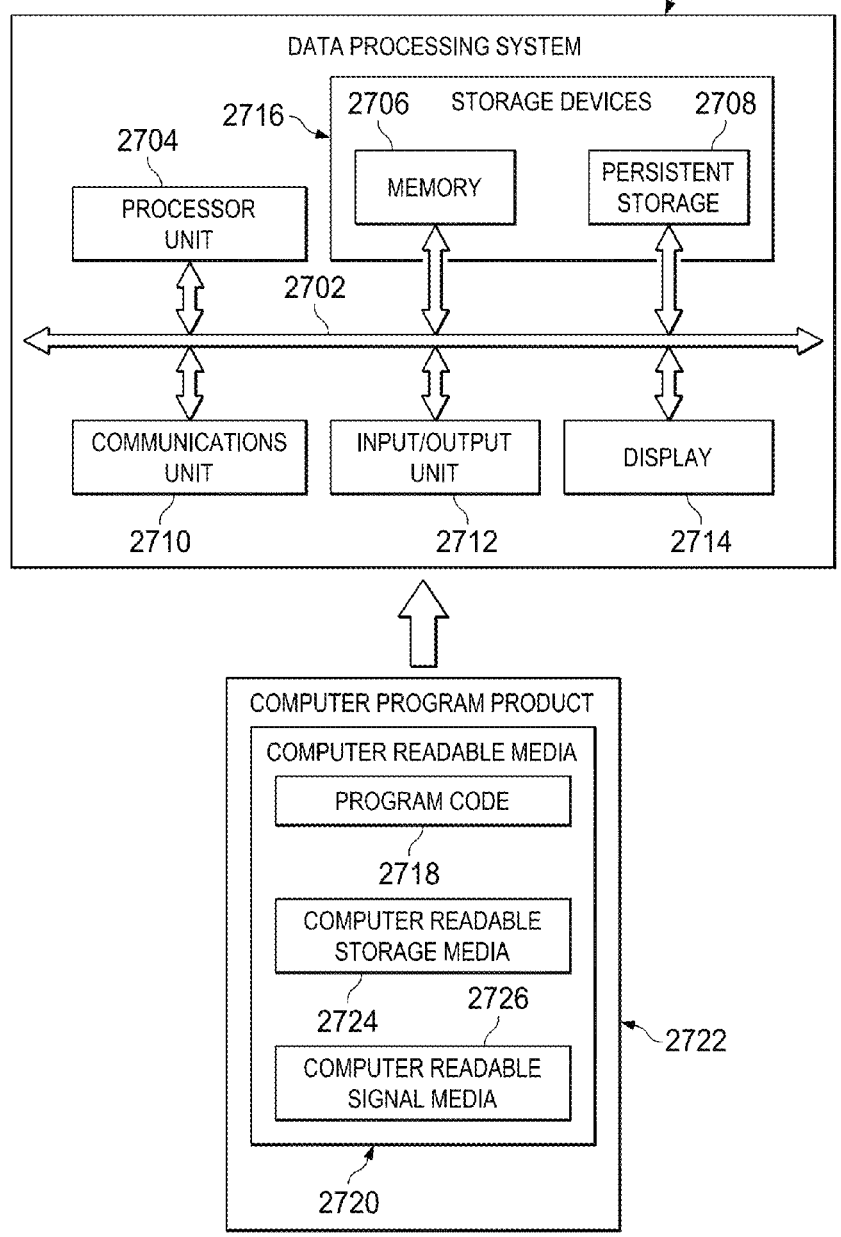

CONTEXT-BASED TARGET RECOGNITION

BACKGROUND INFORMATION

1. Field

The present disclosure relates generally to processing images and, in particular, to identifying objects in images. Still more particularly, the present disclosure relates to a method and apparatus for identifying target objects in images using contextual information in the images.

2. Background

Target recognition is the identification of one or more target objects in a number of images. The target objects to be identified may include, for example, without limitation, people, vehicles, buildings, structures, geographic features, and/or other types of objects. Target recognition may be used when performing various types of missions. These missions may include, for example, without limitation, surveillance, reconnaissance, weapons deployment, cargo drops, and/or other suitable types of missions.

Oftentimes, radar imaging is used to generate the images used in these types of missions. Synthetic aperture radar (SAR) imaging is a form of radar imaging in which an antenna may be mounted to a mobile platform. Typically, the mobile platform is an aerospace platform. An aerospace platform may be, for example, without limitation, an aircraft, an unmanned aerial vehicle, a helicopter, a missile, a satellite, a space shuttle, or some other suitable type of aerospace platform.

With synthetic aperture radar imaging, the mobile platform carrying a synthetic aperture radar system moves along a path. As the mobile platform moves along the path, an antenna in the synthetic aperture radar system sends pulses of electromagnetic radiation. This electromagnetic radiation is in the form of electromagnetic waves, which are also referred to as electromagnetic signals. These electromagnetic signals may have wavelengths, for example, from about 10 millimeters to about one meter.

The electromagnetic signals are directed at an area. The area may be, for example, an area of terrain, a block in a neighborhood, a section of a forest, a portion of a city, a plant, a bridge, or some other suitable type of area.

When these electromagnetic signals encounter a surface of the area, at least a portion of the electromagnetic signals is reflected off of the surface. The electromagnetic waves that are reflected off the surface may be referred to as backscatter, scattered electromagnetic waves, scattered electromagnetic signals, echo waves, or echoes.

As the mobile platform moves along the path over the area, the antenna detects the electromagnetic signals reflected off of the surface in response to the pulses sent by the antenna. The electromagnetic signals received at the antenna as the antenna moves along the path are processed to form an image of the area.

Additionally, synthetic aperture radar imaging may be implemented as inverse synthetic aperture radar imaging. This type of imaging is performed using a stationary antenna or an antenna mounted to a stationary platform. An image is generated for moving objects in the area observed over time.

With currently-available systems for target recognition using the number of images generated using synthetic aperture radar imaging, false identifications of objects may occur more often than desired. Corrective actions may need to be taken when false identifications occur. As a result, additional processing may occur to verify that the objects that have been identified are the target objects. Further, the time needed to recognize objects may be important when using that information to control the mobile platform or perform other actions that are time sensitive. The time needed to perform target recognition using currently-available systems may be greater than desired.

Therefore, it would be advantageous to have a method and apparatus that takes into account at least some of the issues discussed above, as well as possibly other issues.

SUMMARY

In one advantageous embodiment, a method is provided for identifying a target object. A group of objects is identified in an image. The group of objects provides a context for identifying the target object in the image. The target object is searched for in the image using the context provided by the group of objects.

In another advantageous embodiment, an apparatus comprises a context recognition module and a target recognition module. The context recognition module is configured to identify a group of objects in an image. The group of objects provides a context for identifying a target object in the image. The target recognition module is configured to search for the target object in the image using the context provided by the group of objects.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 14 is an illustration of a vegetation detector in accordance with an advantageous embodiment;

FIG. 17 is an illustration of a binary image for use in identifying vegetation in accordance with an advantageous embodiment;

FIG. 22 is an illustration of a flowchart of a process for identifying a target object in accordance with an advantageous embodiment;

FIG. 24 is an illustration of a flowchart of a process for detecting buildings in an image in accordance with an advantageous embodiment;

FIG. 27 is an illustration of a data processing system in accordance with an advantageous embodiment.

DETAILED DESCRIPTION

Figure 1:
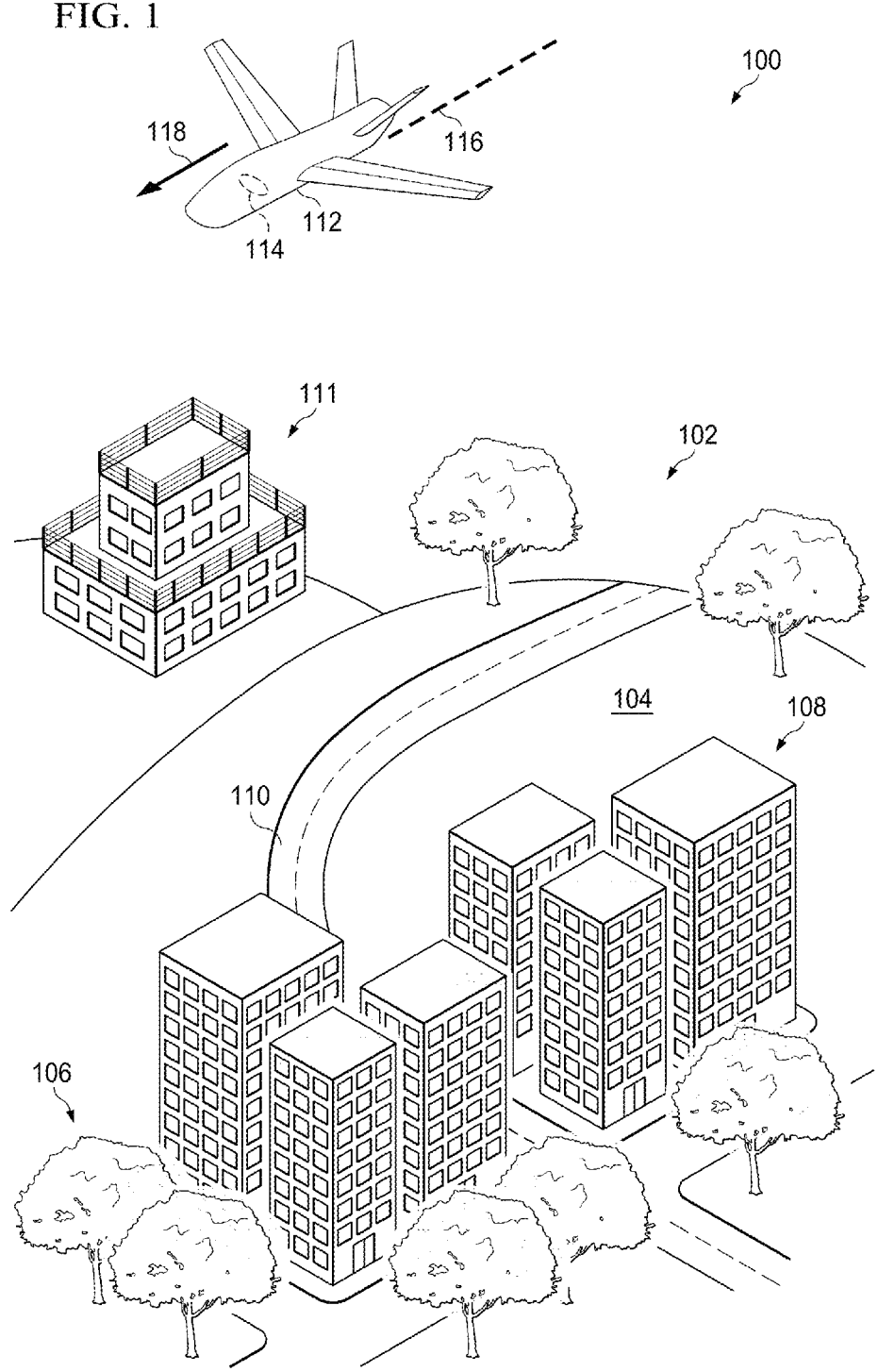
FIG. 1 is an illustration of an imaging environment in accordance with an advantageous embodiment.

Referring now to the figures, in FIG. 1, an illustration of an imaging environment is depicted in accordance with an advantageous embodiment. In this illustrative example, imaging environment 100 is an environment in which images may be generated for area 102. Area 102 includes terrain 104, vegetation 106, buildings 108, road 110, ground station 111, and other objects within area 102.

As depicted, unmanned aerial vehicle (UAV) 112 is present in imaging environment 100. Radar imaging system 114 is mounted to unmanned aerial vehicle 112. Radar imaging system 114 is a synthetic aperture radar (SAR) imaging system in this illustrative example.

Radar imaging system 114 is configured to send pulses of electromagnetic signals towards area 102 as unmanned aerial vehicle 112 moves along flight path 116 in the direction of arrow 118. Further, radar imaging system 114 is configured to detect electromagnetic signals reflected off of the various surfaces in area 102. These surfaces may include the surfaces of, for example, terrain 104, vegetation 106, buildings 108, and/or road 110.

Radar imaging system 114 processes the electromagnetic signals received as unmanned aerial vehicle 112 flies over area 102 along flight path 116 to generate an image of area 102. This image may be used to identify a number of target objects in area 102. As used herein, "a number of items" means one or more items. For example, "a number of target objects" means one or more target objects.

A target object may take the form of, for example, without limitation, at least one of a person, a vehicle, a tank, a truck, a motorcycle, a car, a missile, a mobile object, and/or some other suitable type of object. As used herein, the phrase "at least one of", when used with a list of items, means that different combinations of one or more of the listed items may be used, and only one of each item in the list may be needed.

For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In this illustrative example, ground station 111 and/or unmanned aerial vehicle 112 may be configured to process images generated by radar imaging system 114 in accordance with an advantageous embodiment. In particular, ground station 111 and/or unmanned aerial vehicle 112 may process the images of area 102 to identify target objects in the images in accordance with an advantageous embodiment. This processing may be performed to reduce the number of false identifications of target objects in the images.

The different advantageous embodiments recognize and take into account a number of different considerations. For example, the different advantageous embodiments recognize and take into account that some currently-available methods for identifying a target object in an image search for the target object in a scene in the image using a pre-defined model for the target object. The different advantageous embodiments recognize and take into account that these methods may not use contextual information present in the scene in the image when identifying the target object.

Contextual information in an image may include, for example, an identification of buildings, vegetation, roads, and/or other structures in the scene in the image and/or other suitable information identified using the image. The different advantageous embodiments recognize and take into account that identifying the target object using contextual information identified in the image may reduce an amount of space in the scene in the image that needs to be searched as compared to using currently-available methods for identifying target objects.

Further, the different advantageous embodiments recognize and take into account that currently-available systems for identifying target objects may take more time and/or effort than desired. However, the different advantageous embodiments recognize and take into account that using contextual information in the image to identify the target object may allow target objects to be identified more quickly than with currently-available methods.

Additionally, the different advantageous embodiments recognize and take into account that noise and/or other undesired features may be present in an image. These undesired features may lead to a greater number of false identifications of target objects than desired. The different advantageous embodiments recognize and take into account that using contextual information in the image to identify the target object may reduce the number of false identifications of target objects as compared to currently available methods.

Thus, the different advantageous embodiments provide a method and apparatus for identifying a target object in an image. In particular, a method and apparatus for identifying a target object in an image using contextual information identified in the image is provided. In one advantageous embodiment, a group of objects is identified in an image. The group of objects provides a context for identifying a target object in the image. The image is then searched for the target object using the context provided by the group of objects.

Figure 2:
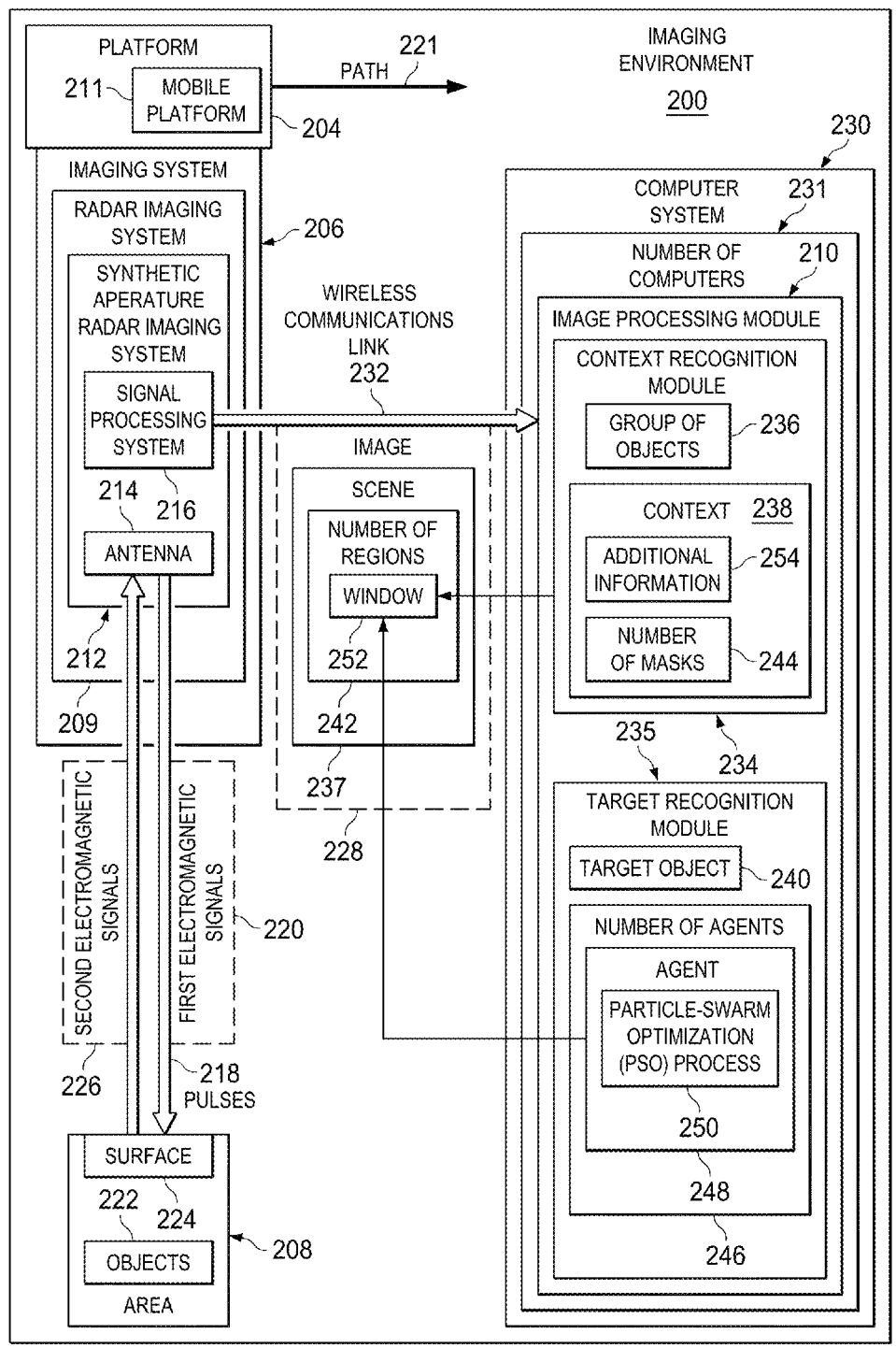
FIG. 2 is an illustration of an imaging environment in accordance with an advantageous embodiment.

With reference now to FIG. 2, an illustration of an imaging environment is depicted in accordance with an advantageous embodiment. Imaging environment 100 in FIG. 1 is an example of one implementation for imaging environment 200. As depicted, imaging environment 200 includes platform 204, imaging system 206, area 208, and image processing module 210.

Platform 204 may be selected from one of, for example, without limitation, a mobile platform, a stationary platform, an aerial platform, a land-based platform, an aquatic-based platform, a space-based platform, and/or some other suitable type of platform. For example, platform 204 may take the form of an aircraft, an unmanned aerial vehicle, a missile, a helicopter, a spacecraft, a satellite, a space station, a submarine, a bus, a personnel carrier, a tank, a train, an automobile, a surface ship, a building, and/or some other suitable object. In these illustrative examples, platform 204 takes the form of mobile platform 211.

In these depicted examples, imaging system 206 is associated with mobile platform 211. A first component, such as imaging system 206, may be considered to be associated with a second component, such as mobile platform 211, by being secured to the second component, bonded to the second component, welded to the second component, fastened to the second component, mounted to the second component, and/or connected to the second component in some other suitable manner. The first component also may be connected to the second component using a third component. The first component may also be considered to be associated with the second component by being formed as part of and/or an extension of the second component.

As depicted, imaging system 206 is radar imaging system 209. More specifically, radar imaging system 209 takes the form of synthetic aperture radar (SAR) imaging system 212 in these illustrative examples. Imaging system 206 may comprise antenna 214 and signal processing system 216.

In these illustrative examples, antenna 214 is configured to send pulses 218 of first electromagnetic signals 220 towards area 208 in imaging environment 200 as mobile platform 211 moves along path 221 relative to area 208. Path 221 may be over area 208, to a side of area 208, behind area 208, and/or relative to area 208 in some other manner.

Area 208 may include, for example, without limitation, at least one of a region of terrain, a city, a block in a neighborhood, a town, an area of a city, a forest area, a mountainous region, a valley, an area of an ocean, a lake, a manufacturing facility, a power plant, a region of airspace, a region of space, and some other suitable type of area. Objects 222 may be present in area 208. In these illustrative examples, objects 222 may include at least one of a building, a tree, a plant, a bush, a road, a highway, a structure, a sidewalk, a parking lot, a parking garage, a person, a feature of terrain in area 208, and other suitable types of objects.

At least a portion of first electromagnetic signals 220 sent by antenna 214 are reflected off of surface 224 of area 208. Surface 224 of area 208 includes the surface of any terrain in area 208 and the surfaces of objects 222 in area 208.

In these depicted examples, the portion of first electromagnetic signals 220 reflected off of surface 224 of area 208 forms second electromagnetic signals 226. Second electromagnetic signals 226 also may be referred to as backscatter, scattered electromagnetic signals, or echoes.

Antenna 214 is configured to detect second electromagnetic signals 226 over time as mobile platform 211 moves along path 221 relative to area 208. Antenna 214 sends second electromagnetic signals 226 received at antenna 214 to signal processing system 216 for processing. Signal processing system 216 may be implemented using hardware, software, or a combination of the two in these examples.

As depicted, signal processing system 216 is configured to generate image 228 of area 208 using second electromagnetic signals 226. In some illustrative examples, signal processing system 216 may be configured to perform preprocessing operations prior to generating image 228. In other illustrative examples, signal processing system 216 may include information with image 228. This information may include, for example, without limitation, a timestamp, a location of mobile platform 211, and/or other suitable information.

In these illustrative examples, signal processing system 216 sends image 228 to image processing module 210. Image processing module 210 may be implemented using hardware, software, or a combination of the two. In these illustrative examples, image processing module 210 may be implemented in computer system 230. Computer system 230 may take the form of number of computers 231.

Image processing module 210 may be located remote to imaging system 206 in these illustrative examples. For example, image processing module 210 may be located in mobile platform 211. In other illustrative examples, image processing module 210 may be located at a ground station, control tower, or some other location remote to signal processing system 216. As one illustrative example, when image processing module 210 is located at a ground station, signal processing system 216 sends image 228 to image processing module 210 using wireless communications link 232.

In these illustrative examples, image processing module 210 comprises context recognition module 234 and target recognition module 235. In these depicted examples, context recognition module 234 is configured to identify group of objects 236 in scene 237 in image 228. As used herein, "a group of items" means one or more items. For example, "a group of objects" means one or more objects. Scene 237 is the portion of area 208 captured in image 228.

Group of objects 236 provides context 238 for identifying target object 240 in image 228. An object in group of objects 236 may be, for example, a building, vegetation, a road, or some other suitable type of object. Target object 240 may be any object that is an object of interest.

Context 238 for identifying target object 240 comprises the information present in scene 237 in image 228 that may be used to identify target object 240 in image 228. Further, context 238 provided by group of objects 236 may be used to verify that an identification of an object in scene 237 is target object 240. Number of regions 242 in image 228 for searching for target object 240 may be identified using context 238 provided by group of objects 236.

In these illustrative examples, a region in number of regions 242 may be selected from within group of objects 236, within a selected distance from group of objects 236, outside of a selected distance from group of objects 236, and/or relative to group of objects 236 in some other suitable manner.

In one illustrative example, context recognition module 234 forms number of masks 244 using context 238 provided by group of objects 236. Context recognition module 234 uses number of masks 244 to identify number of regions 242 in image 228 for searching for target object 240. Target recognition module 235 is configured to search for target object 240 in number of regions 242 in image 228 using number of masks 244.

Further, target recognition module 235 is configured to search for target object 240 in number of regions 242 using number of agents 246. Agent 248 is an example of one of number of agents 246. Agent 248 is a search process that is configured to search for target object 240 within window 252 for agent 248. A size and/or shape for window 252 may be selected based on the type of target object 240 for which the search is performed. Further, windows for different agents in number of agents 246 may have the same or different sizes and/or shapes.

Number of agents 246 may function as a swarm and search for target object 240 using particle-swarm optimization (PSO) process 250. This process optimizes a problem by iteratively trying to improve a candidate solution with regard to a given measure of quality. For example, a placement of window 252 for agent 248 relative to image 228 may be a candidate solution for the identification of target object 240. The candidate solution also may be referred to as a particle.

Window 252 is moved within number of regions 242 in image 228 according to simple mathematical formulae for a position and velocity for window 252. In these illustrative examples, agent 248 identifies a best known position for window 252 in number of regions 242. Further, other agents in number of agents 246 identify best known positions for windows corresponding to these other agents. These best known positions are updated as better positions are identified.

The position and/or movement of window 252 within number of regions 242 in image 228 is guided by the best known position identified by agent 248 and the updated best known positions for the other agents in number of agents 246. In this manner, number of agents 246 may move as a swarm towards the best position in number of regions 242 for identifying target object 240.

In some illustrative examples, context 238 for identifying target object 240 may also be provided by additional information 254. Additional information 254 may include information obtained from sources other than image 228. Additional information 254 may include, for example, without limitation, intelligence information, geographical data, maps, mission details, weather data, location information, and/or other suitable types of information.

In this manner, target recognition module 235 uses context 238 provided by group of objects 236 to identify target object 240 in image 228 more quickly as compared to currently-available methods that may search all of image 228 for target object 240.

Further, using target recognition module 235 may reduce the possibility of a false identification of target object 240 in image 228. For example, target object 240 to be identified in image 228 may be a tank. In this example, group of objects 236 provide context 238 for identifying the tank. Group of objects 236 may comprise, for example, vegetation, such as trees. Number of regions 242 is identified using context 238 provided by the trees such that target recognition module 235 does not identify the tank within the trees.

The illustration of imaging environment 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, platform 204 may be a stationary platform instead of mobile platform 211. In other illustrative examples, a portion of image processing module 210 may be part of signal processing system 216 in imaging system 206. A portion of image processing module 210 may be some or all of image processing module 210 in these illustrative examples.

Further, in other illustrative examples, target recognition module 235 may be configured to identify other target objects in addition to and/or in place of target object 240. In still other illustrative examples, target recognition module 235 may use other processes, in addition to and/or in place of particle-swarm optimization process 250 to search for target object 240 in image 228.

Figure 3:
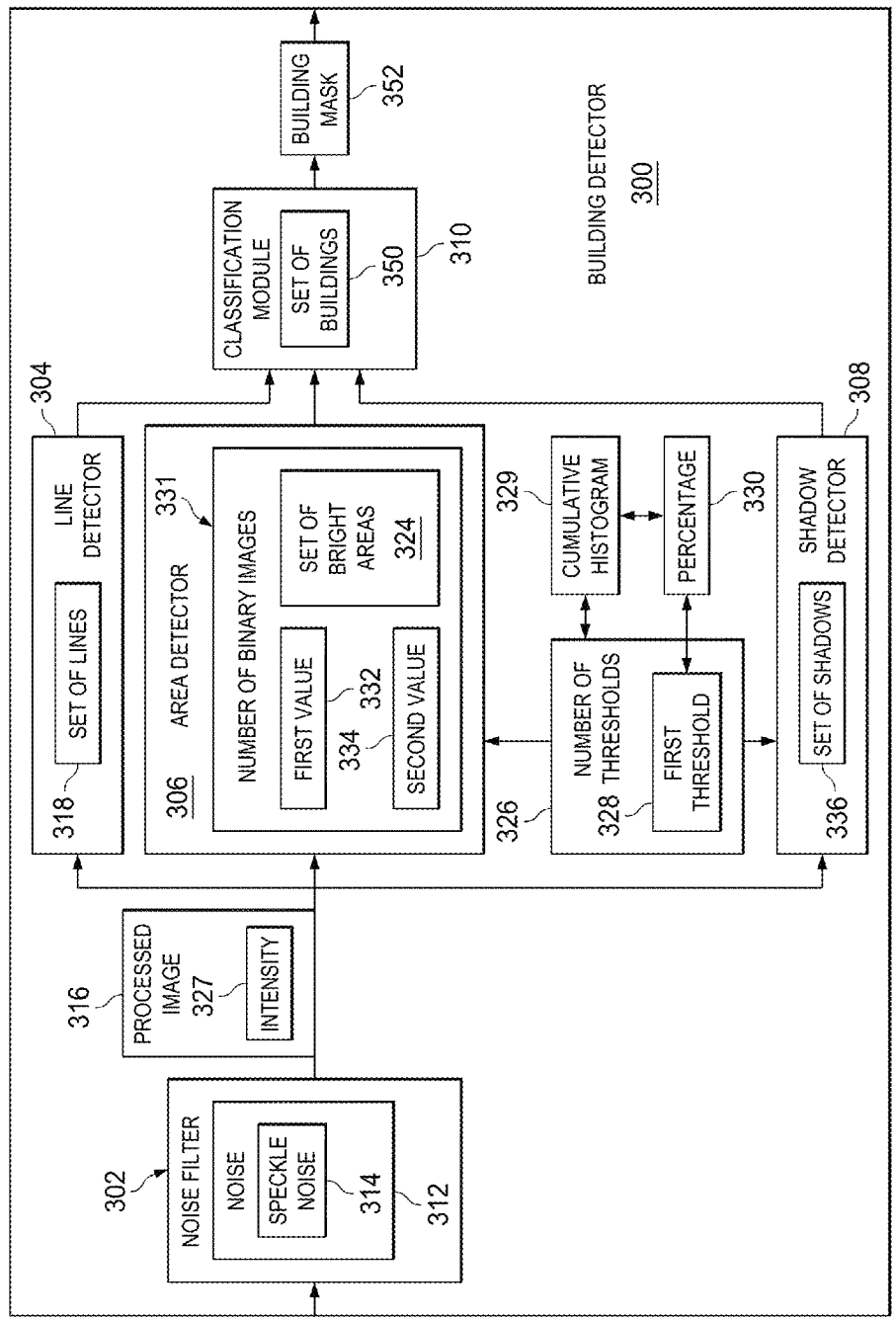
FIG. 3 is an illustration of a building detector in accordance with an advantageous embodiment.

With reference now to FIG. 3, an illustration of a building detector is depicted in accordance with an advantageous embodiment. Building detector 300 may be implemented in context recognition module 234 in FIG. 2. In particular, building detector 300 is configured to identify buildings that may be in image 228 in FIG. 2. Any buildings that are identified may form a portion of group of objects 236 in FIG. 2.

In this illustrative example, building detector 300 comprises noise filter 302, line detector 304, area detector 306, shadow detector 308, and classification module 310. Noise filter 302 is configured to reduce noise 312 that may be present in image 228. The reduction of noise 312 may substantially remove noise in image 228 in a manner that provides a desired quality for image 228.

Noise 312 may take the form of, for example, speckle noise 314. Speckle noise 314 may be a granular noise that is present in image 228. Speckle noise 314 may be caused by undesired random fluctuations in second electromagnetic signals 226 received at antenna 214 in imaging system 206 in FIG. 2.

As depicted, after noise filter 302 processes image 228 to reduce noise 312, processed image 316 is present. Line detector 304 is configured to identify set of lines 318 in processed image 316. As used herein, "a set of items" may be zero or more items. For example, "a set" may be an empty or null set. In this depicted example, lines in set of lines 318 are bright lines.

In this illustrative example, line detector 304 may be implemented using an algorithm developed by Carsten Steger. This algorithm extracts set of lines 318 from processed image 316 and estimates a width for each of set of lines 318. This algorithm also identifies a position for each line in set of lines 318 and estimates the width for each line with a sub-pixel level of accuracy.

Further, area detector 306 is configured to identify set of bright areas 324 in this illustrative example. Set of bright areas 324 is identified using number of thresholds 326 for intensity 327 in processed image 316. Intensity 327 for each pixel in processed image 316 may be from about zero to about 255. In particular, a portion of set of bright areas 324 may be identified for each threshold in number of thresholds 326 applied to processed image 316.

In this illustrative example, number of thresholds 326 is selected based on cumulative histogram 329 for processed image 316. Cumulative histogram 329 plots level of intensity versus a cumulative percentage of pixels in processed image 316.

In particular, first threshold 328 in number of thresholds 326 may be selected based on percentage 330. Percentage 330 is selected using cumulative histogram 329. Percentage 330 is the percentage of pixels that are to be included in the process for identifying set of bright areas 324. Percentage 330 is selected to be between about 85 percent and about 95 percent.

As one illustrative example, first threshold 328 may be selected as the level of intensity at which percentage 330 is about 90 percent.

In this illustrative example, other thresholds in number of thresholds 326 may be selected by substantially equally dividing the interval between first threshold 328 and a highest level of intensity 327 in processed image 316 by a total number of thresholds in number of thresholds 326.

Area detector 306 applies number of thresholds 326 to processed image 316 to identify number of binary images 331. A binary image is an image in which each pixel in the binary image has only two values. These two values are first value 332 and second value 334.

In this illustrative example, first value 332 for the pixel indicates that the intensity for that pixel is less than the particular threshold from number of thresholds 326 applied to the pixel. Second value 334 for the pixel indicates that the intensity for that pixel is greater than the particular threshold from number of thresholds 326 applied to the pixel. Pixels in a binary image in number of binary images 331 that have second value 334 are identified as being part of a bright area.

Set of bright areas 324 may be present in number of binary images 331. A binary image in number of binary images 331 may include bright areas that are not present in other binary images in number of binary images 331. In some cases, no bright areas may be present in one or more of number of binary images 331.

Of course, other processes for identifying set of bright areas 324 may be used. For example, in some cases, area detector 306 may be configured to identify set of bright areas 324 using image 228 instead of processed image 316.

In this illustrative example, shadow detector 308 is configured to identify set of shadows 336. Shadow detector 308 identifies set of shadows 336 in a manner similar to the manner in which area detector 306 identifies set of bright areas 324. For example, shadow detector 308 applies number of thresholds 326 to processed image 316. First threshold 328 in number of thresholds 326 is selected based on percentage 330. Percentage 330 may be selected to be between about 20 percent and about 25 percent.

Other thresholds in number of thresholds 326 are selected by substantially equally dividing the interval between first threshold 328 and a lowest level of intensity 327 in processed image 316 by the total number of thresholds in number of thresholds 326. Number of thresholds 326 may be applied to processed image 316 to obtain number of binary images 331. Set of shadows 336 is present in number of binary images 331.

In this illustrative example, classification module 310 is configured to process set of lines 318, set of bright areas 324, and set of shadows 336 to identify which of the items in these sets are produced by buildings in image 228. Classification module 310 identifies set of buildings 350 using set of lines 318, set of bright areas 324, set of shadows 336, and/or other suitable information.

Further, classification module 310 may generate building mask 352 by identifying set of buildings 350 in image 228. Building mask 352 may include, for example, locations of set of buildings 350 in image 228.

The illustration of building detector 300 in FIG. 3 is not meant to imply limitations to the manner in which an advantageous embodiment may be implemented. For example, in some illustrative examples, thresholds in number of thresholds 326 other than first threshold 328 may be selected by identifying the centroids of clusters of pixels identified based on intensity. The clusters may be identified using, for example, a K-means clustering algorithm and/or other suitable clustering algorithms.

Figure 4:
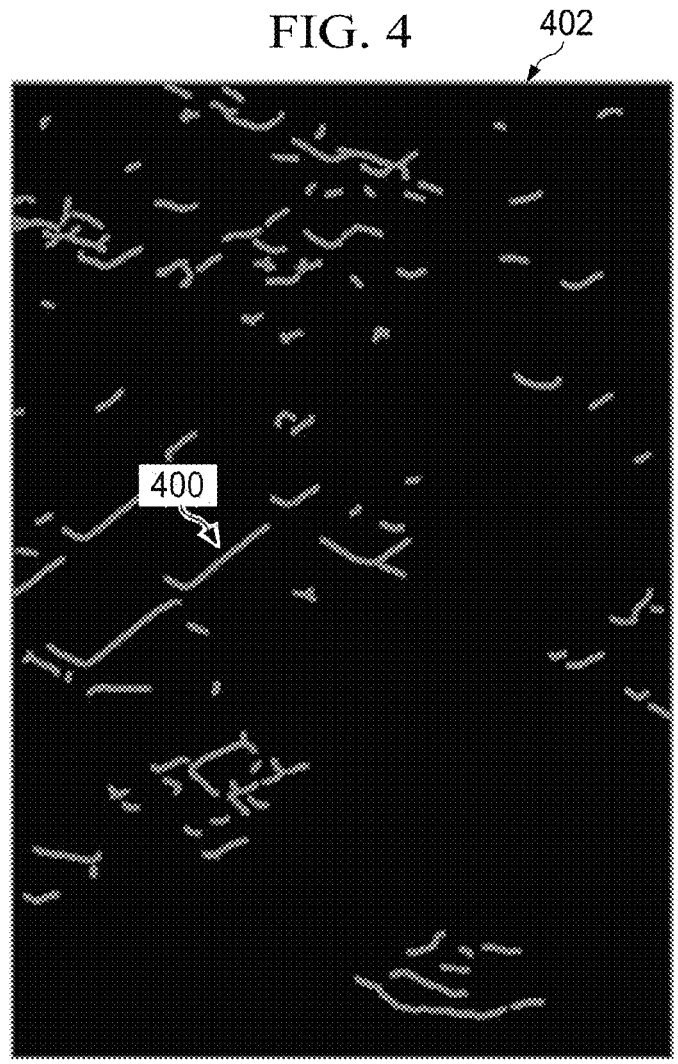
FIG. 4 is an illustration of a detection of lines in an image in accordance with an advantageous embodiment.

With reference now to FIG. 4, an illustration of a detection of lines in an image is depicted in accordance with an advantageous embodiment. In this illustrative example, lines 400 have been identified in image 402. The detection of lines 400 may have been made by, for example, line detector 304 in building detector 300 in FIG. 3.

Lines 400 may be filtered to identify a set of lines, such as set of lines 318 in FIG. 3. Lines 400 may be filtered using a number of criteria. In particular, any line in lines 400 having a length in image 402 that corresponds to a length of at least about 10 meters in the real world is selected. The Hough transform may be applied to these selected lines to further filter lines 400 to identify the set of lines. Using the Hough transform, any line having a substantially straight portion with a length corresponding to a length of at least about 10 meters in the real world is included in the set of lines.

Figure 5:
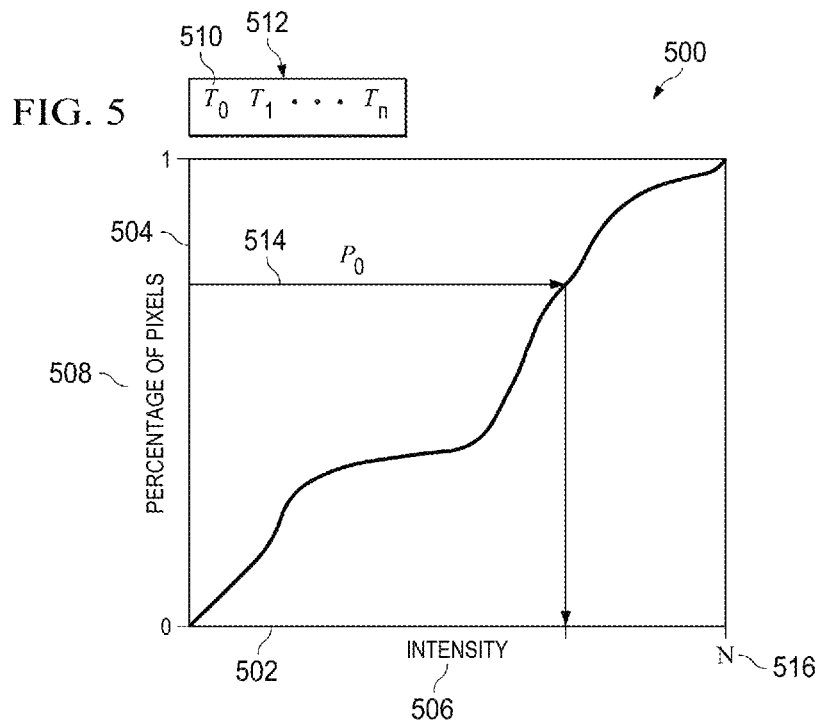
FIG. 5 is an illustration of a cumulative histogram in accordance with an advantageous embodiment.

With reference now to FIG. 5, an illustration of a cumulative histogram is depicted in accordance with an advantageous embodiment. In this illustrative example, cumulative histogram 500 is an example of one implementation for cumulative histogram 329 in FIG. 3.

As depicted, cumulative histogram 500 has horizontal axis 502 and vertical axis 504. Horizontal axis 502 is intensity 506. Vertical axis 504 is percentage of pixels 508.

In this illustrative example, first threshold 510, $T_o$, in number of thresholds 512 is selected based on percentage 514, $P_o$. Other thresholds in number of thresholds 512 are selected by dividing the interval along horizontal axis 502 between first threshold 510 and highest intensity 516, N, by the total number of thresholds in number of thresholds 512.

Figure 6:
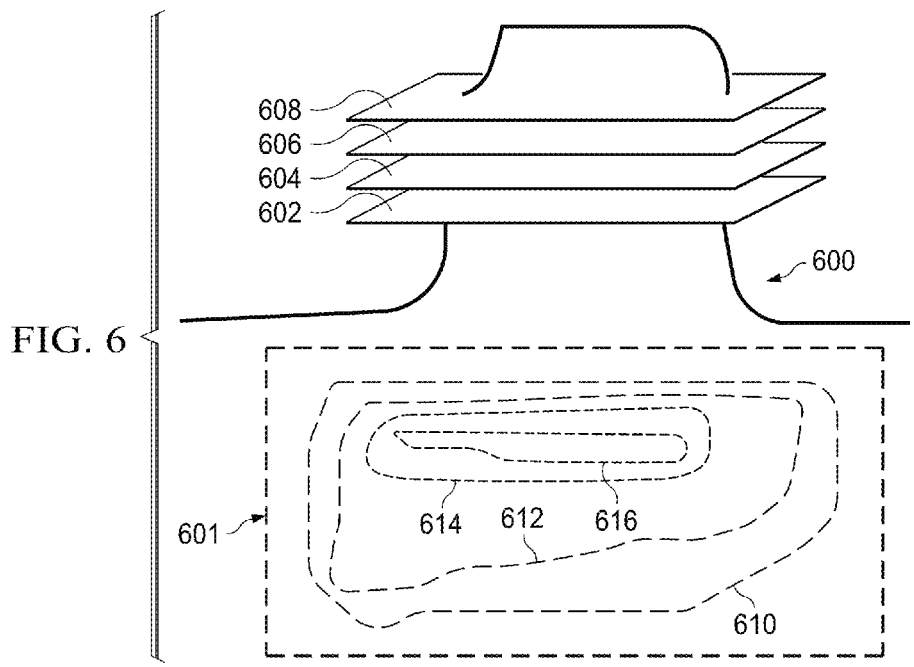
FIG. 6 is an illustration of a method for identifying bright areas in accordance with an advantageous embodiment.

With reference now to FIG. 6, an illustration of a method for identifying bright areas is depicted in accordance with an advantageous embodiment. In this illustrative example, intensity 600 is the intensity for pixels in section 601 of an image, such as processed image 316 in FIG. 3.

First level of intensity 602 is a first threshold in a number of thresholds to be applied to the image. Second level of intensity 604 represents a second threshold in the number of thresholds. Third level of intensity 606 represents a third threshold in the number of thresholds. Fourth level of intensity 608 represents a fourth threshold in the number of thresholds.

As depicted in this example, first portion 610 of section 601 is the portion of section 601 having pixels with an intensity substantially equal to or greater than first level of intensity 602. Second portion 612 of section 601 is the portion of section 601 having pixels with an intensity substantially equal to or greater than second level of intensity 604.

Third portion 614 of section 601 is the portion of section 601 having pixels with an intensity substantially equal to or greater than third level of intensity 606. Fourth portion 616 of section 601 is the portion of section 601 having pixels with an intensity substantially equal to or greater than fourth level of intensity 608.

With reference now to FIGS. 7-10, illustrations of binary images in which bright areas are present are depicted in accordance with an advantageous embodiment. In these illustrative examples, these binary images may be generated by an area detector, such as area detector 306 in building detector 300 in FIG. 3. In particular, these binary images may be generated by filtering a processed image, such as processed image 316 in FIG. 3, for varying levels of intensity.

Figure 7:
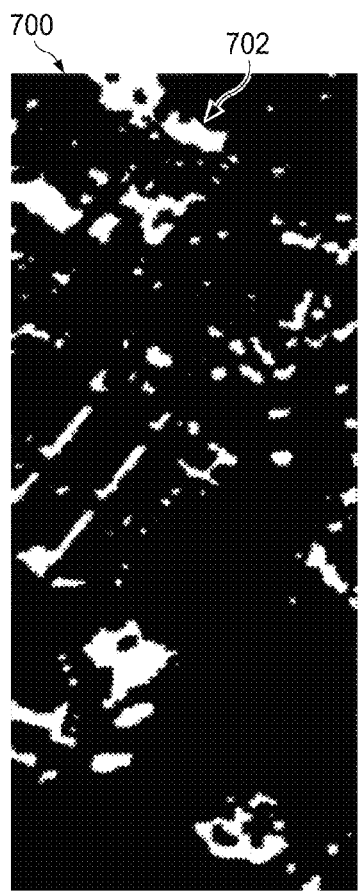
FIG. 7 is an illustration of a binary image in which bright areas are present in accordance with an advantageous embodiment.

Turning now to FIG. 7, binary image 700 is generated by filtering the processed image for pixels having an intensity substantially equal to or greater than first level of intensity 602 in FIG. 6. The portions of the processed image having pixels with an intensity substantially equal to or greater than first level of intensity 602 are represented in binary image 700 as bright areas 702.

Figure 8:
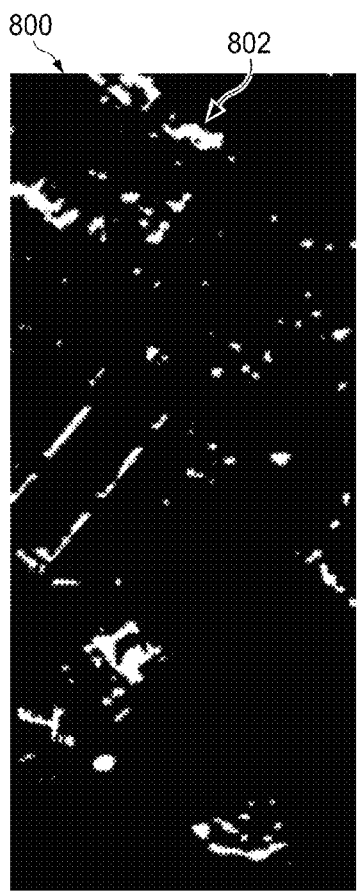
FIG. 8 is another illustration of a binary image in which bright areas are present in accordance with an advantageous embodiment.

Turning now to FIG. 8, binary image 800 is generated by filtering the processed image for pixels having an intensity substantially equal to or greater than second level of intensity 604 in FIG. 6. The portions of the processed image having pixels with an intensity substantially equal to or greater than second level of intensity 604 are represented in binary image 800 as bright areas 802.

Figure 9:
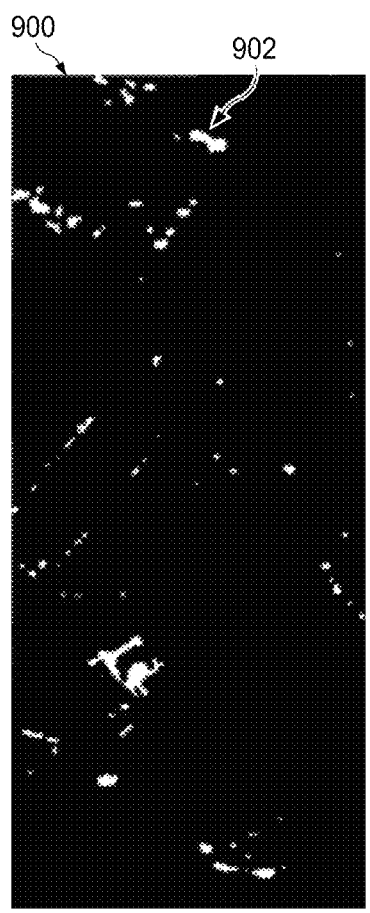
FIG. 9 is another illustration of a binary image in which bright areas are present in accordance with an advantageous embodiment.

Similarly, in FIG. 9, binary image 900 is generated by filtering the processed image for pixels having an intensity substantially equal to or greater than third level of intensity 606 in FIG. 6. The portions of the processed image having pixels with an intensity substantially equal to or greater than third level of intensity 606 are represented in binary image 900 as bright areas 902.

Figure 10:
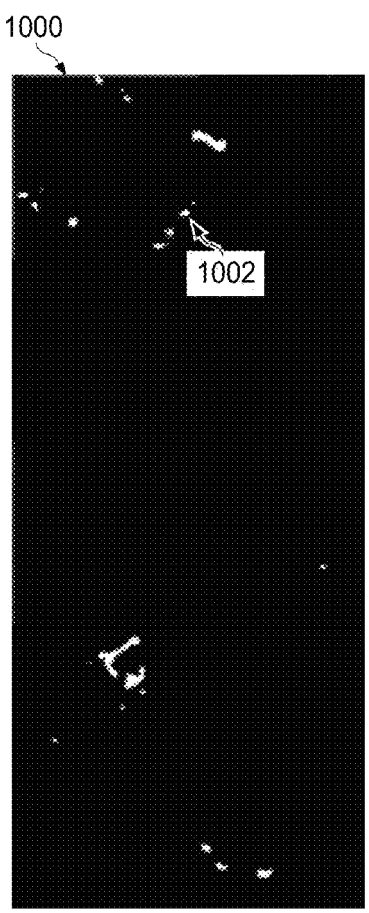
FIG. 10 is another illustration of a binary image in which bright areas are present in accordance with an advantageous embodiment.

Further, in FIG. 10, binary image 1000 is generated by filtering the processed image for pixels having an intensity substantially equal to or greater than fourth level of intensity 608 in FIG. 6. The portions of the processed image having pixels with an intensity substantially equal to or greater than fourth level of intensity 608 are represented in binary image 1000 as bright areas 1002.

In these illustrative examples, bright areas 702 in FIG. 7, bright areas 802 in FIG. 8, bright areas 902 in FIG. 9, and bright areas 1002 in FIG. 10 are processed to identify bright areas that represent buildings. In particular, a confidence score is assigned to each bright area.

The confidence score may be identified based on shape descriptors, such as, for example, elliptical Fourier descriptors, for the bright areas. These types of shape descriptors may be used given that buildings typically produce a rectangular or L-shaped bright area. The confidence score may be identified based on how closely the shape for a bright area matches a shape descriptor for the bright area. Further, the confidence score may be identified based on training tests for typical bright areas produced by buildings.

In one illustrative example, the confidence scores for a bright area in each of the different levels of intensity may be summed to identify a confidence score for the bright area. This confidence score may then be compared to a selected threshold. A bright area having a confidence score greater than the selected threshold may be identified as a bright area that may have been produced by a building.

In these illustrative examples, shadows that may have been produced by buildings are identified in a manner similar to the way in which bright areas that may have been produced by buildings are identified.

Figure 11:
FIG. 11 is an illustration of an image generated using a synthetic aperture radar imaging system in accordance with an advantageous embodiment.

With reference now to FIG. 11, an illustration of an image generated using a synthetic aperture radar imaging system is depicted in accordance with an advantageous embodiment. In this illustrative example, image 1100 is an example of one implementation for image 228 generated using synthetic aperture radar imaging system 212 in FIG. 2. As depicted, buildings 1102 are present in image 1100.

Figure 12:
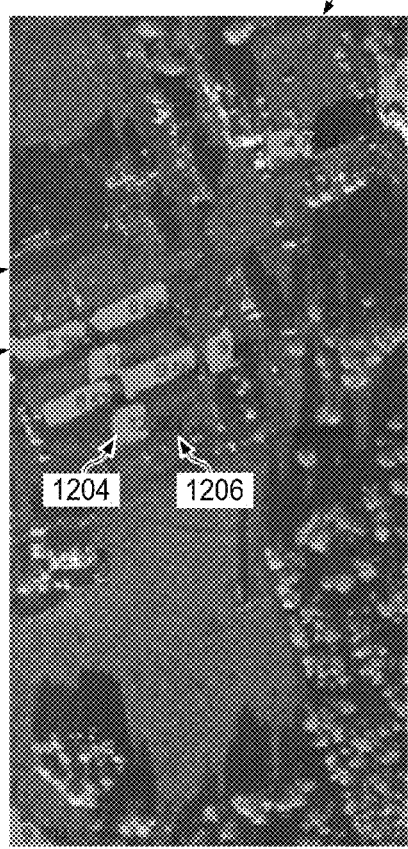
FIG. 12 is an illustration of bright areas and shadows identified in an image in accordance with an advantageous embodiment.

Turning now to FIG. 12, an illustration of bright areas and shadows identified in image 1100 is depicted in accordance with an advantageous embodiment. In this illustrative example, bright areas 1200 and shadows 1202 are identified in image 1100.

Bright areas 1200 may be identified by, for example, area detector 306 in building detector 300 in FIG. 3. Shadows 1202 may be identified by, for example, shadow detector 308 in building detector 300 in FIG. 3. In this illustrative example, the presence of both bright areas 1200 and shadows 1202 are used to identify buildings 1204 in image 1100.

Further, as depicted, heights 1206 may be identified for buildings 1204 identified in image 1100. Heights 1206 are estimations of the actual heights for these buildings. In this illustrative example, heights 1206 may be calculated by building detector 300 using the heights of shadows 1202.

Figure 13:
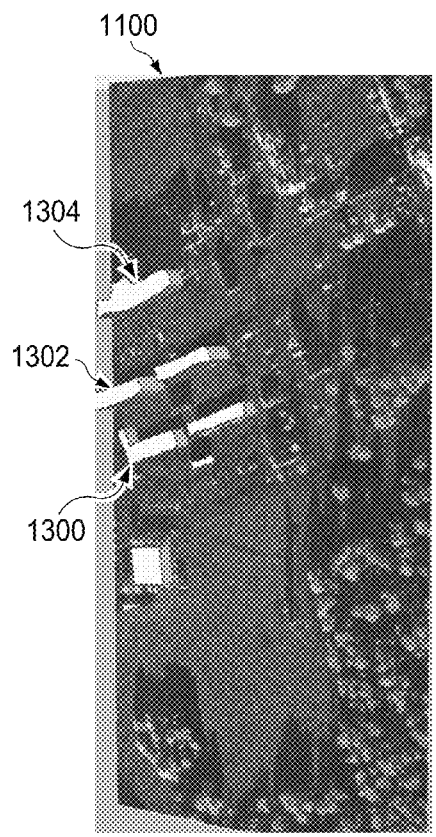
FIG. 13 is an illustration of a building mask for an image in accordance with an advantageous embodiment.

With reference now to FIG. 13, an illustration of a building mask for image 1100 is depicted in accordance with an advantageous embodiment. In this illustrative example, building mask 1300 is overlaid on image 1100. Building mask 1300 is an example of one implementation for building mask 352 in FIG. 3.

As depicted, building mask 1300 identifies buildings 1302 in locations 1304 in image 1100. Buildings 1302 are identified based on the confidence scores for lines, bright areas, and/or shadows identified for image 1100. In particular, a building in buildings 1302 may be represented by the identification of a line, a bright area, a shadow, or some combination of these features.

Building mask 1300 may be used when identifying a target object in image 1100. In other words, portions of image 1100 not identified as buildings 1302 may be searched for the target object.

With reference now to FIG. 14, an illustration of a vegetation detector is depicted in accordance with an advantageous embodiment. In this illustrative example, vegetation detector 1400 may be implemented in context recognition module 234 in FIG. 2. In particular, vegetation detector 1400 is configured to identify vegetation that may be present in image 228 in FIG. 2. Vegetation that is identified may form a portion of group of objects 236 in FIG. 2.

In this illustrative example, vegetation detector 1400 processes image 228 from FIG. 2 using texture features filter 1402, number of texton layout filters 1404, and boosted classifiers 1406. Boosted classifiers 1406 may be a number of boosted classifiers in some illustrative examples. Vegetation detector 1400 applies texture features filter 1402 to image 228. Texture features filter 1402 allows the portions of image 228 that substantially match predefined texture features to be extracted.

In this depicted example, a texture feature is a feature in image 228, such as a pattern, that may represent a particular texture for vegetation and/or background in image 228. A texture feature may also be referred to as a texton. A particular texture may be, for example, without limitation, grass, foliage, human skin, a road, sky, clouds, and/or some other suitable type of texture.

Vegetation detector 1400 identifies texture features 1408 in image 228 in response to applying texture features filter 1402 to image 228. Vegetation detector 1400 uses texture features 1408 to generate texton map 1410. Texton map 1410 identifies where texture features 1408 are located in image 228.

For example, vegetation detector 1400 may group texture features 1408 together based on type using texton codebook 1411. This grouping may also be referred to as clustering and assignment. Texton codebook 1411 is an identification of the types of texture features that might be identified in the image.

Each group of texture features 1408 of a particular type is the output of applying texture features filters 1402 to image 228 and corresponds to a shape in number of shapes 1412 on texton map 1410. Of course, multiple groups of the same type of texture features may be present.

In this illustrative example, number of shapes 1412 may be a number of rectangular shapes. This number of rectangular shapes may have varying lengths and/or widths. Of course, in other illustrative examples, number of shapes 1412 may take the form of other shapes, such as, for example, circular shapes, elliptical shapes, and/or other suitable types of shapes.

Further, in this depicted example, number of shapes 1412 may have number of colors 1414. Each of number of colors 1414 corresponds to a particular type of texture feature. As one illustrative example, when number of shapes 1412 represents texture features of two different types, a portion of number of shapes 1412 will have a first color, while a second portion of number of shapes 1412 has a second color. In some cases, all of number of shapes 1412 may have the same color when all of number of shapes 1412 represents texture features of a same type.

As depicted in this example, vegetation detector 1400 uses texton map 1410 to form number of texton channels 1416. Each texton channel in number of texton channels 1416 is a map for texture features of a particular type. In other words, each texton channel includes the shapes in number of shapes 1412 representing a particular type of texture feature. In this manner, all of the shapes from number of shapes 1412 in a particular texton channel have the same color.

In this illustrative example, vegetation detector 1400 applies number of texton layout filters 1404 to image 228 using number of texton channels 1416. In particular, each of number of texton layout filters 1404 corresponds to one of number of texton channels 1416. In other words, each of number of texton layout filters 1404 is for a particular type of texture feature.

Texton layout filter 1418 is an example of one of number of texton layout filters 1404. Texton layout filter 1418 is a combination of a region in number of regions 1420 and a corresponding pixel marker in number of pixel markers 1422. The region has a fixed size and position with respect to the corresponding pixel marker. Texton layout filter 1418 compares each pixel in image 228 where a pixel marker is placed with image information inside the corresponding region in number of regions 1420.

Vegetation detector 1400 generates number of feature vectors 1424 in response to applying texton layout filter 1418. A feature vector in number of feature vectors 1424 is an n-dimensional vector of numerical features that represent some object or texture in image 228.

Number of feature vectors 1424 is processed using boosted classifiers 1406 to identify texture mask 1426. Boosted classifiers 1406 are texture classifiers that have been identified using boosting algorithms, such as, for example, without limitation, adaptive boosting (AdaBoost), linear programming boosting (LPBoost), and/or other suitable types of boosting algorithms.

Texture mask 1426 identifies textures 1428 in image 228. Textures 1428 may be color-coded in this illustrative example. For example, grass may be represented in texture mask 1426 by a first color, while sky is represented by a second color, and trees are presented by a third color. When texture mask 1426 is generated for only vegetation textures, texture mask 1426 may be a vegetation mask.

Figure 15:
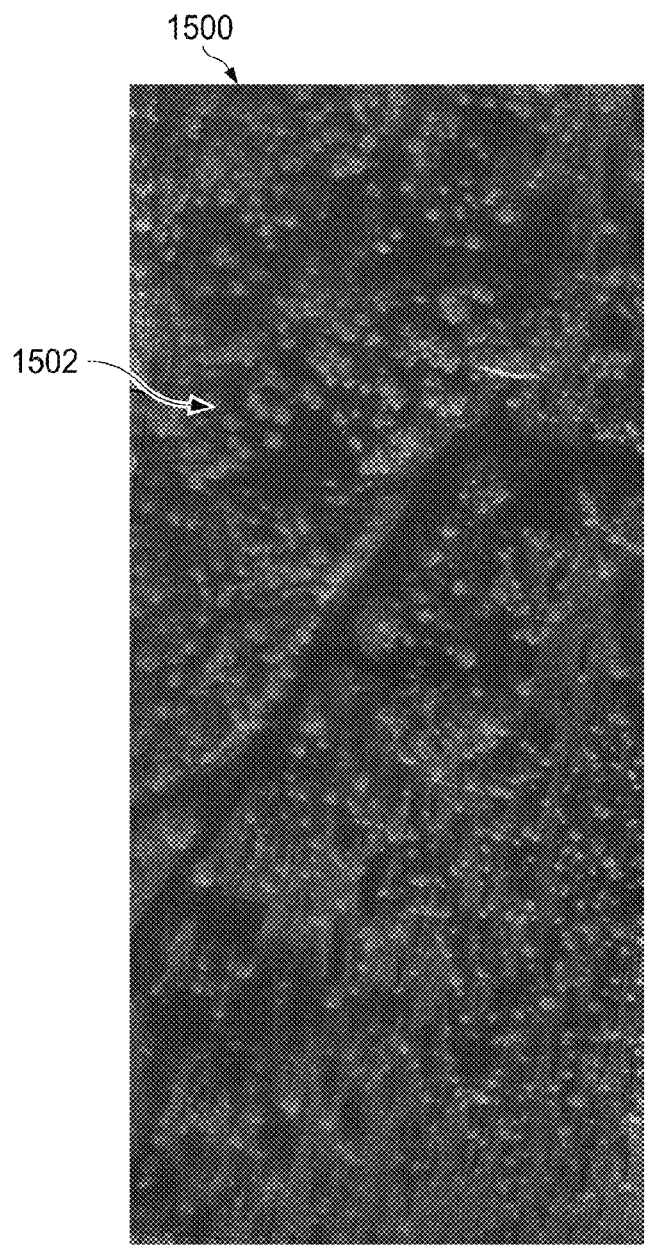
FIG. 15 is an illustration of a process for identifying vegetation in accordance with an advantageous embodiment.

With reference now to FIG. 15, an illustration of an image generated using a synthetic aperture radar imaging system is depicted in accordance with an advantageous embodiment. In this illustrative example, image 1500 is an example of one implementation for image 228 generated using synthetic aperture radar imaging system 212 in FIG. 2. As depicted, vegetation 1502 is present in image 1500.

Figure 16:
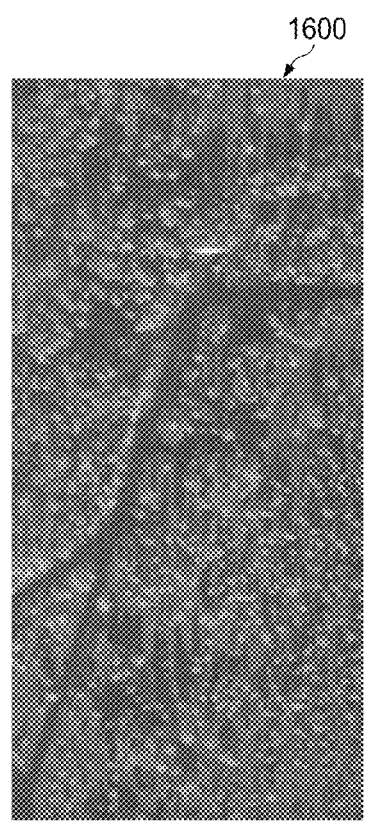
FIG. 16 is an illustration of a vegetation mask for an image in accordance with an advantageous embodiment.

Turning now to FIG. 16, an illustration of a confidence mask for use in identifying vegetation is depicted in accordance with an advantageous embodiment. In this illustrative example, confidence mask 1600 may be generated by a vegetation detector, such as, for example, vegetation detector 1400 in FIG. 14.

Confidence mask 1600 is an image in which the level of intensity for each pixel is based on a confidence score for a corresponding pixel in image 1500 in FIG. 15. This confidence score identifies the confidence with which the pixel in image 1500 represents vegetation. A higher level of intensity corresponds to a higher level of confidence that the corresponding pixel is for vegetation as compared to a lower level of intensity.

A vegetation mask may be identified by applying a threshold to confidence mask 1600. In other words, pixels in confidence mask 1600 having intensities greater than a selected threshold may be identified as vegetation.

With reference now to FIG. 17, an illustration of a vegetation mask for an image is depicted in accordance with an advantageous embodiment. In this illustrative example, vegetation mask 1700 is overlaid on image 1500. Vegetation mask 1700 may be generated by a vegetation detector, such as, for example, vegetation detector 1400 in FIG. 14. Vegetation mask 1700 is identified by applying a threshold to confidence mask 1600 in FIG. 16.

Figure 18:
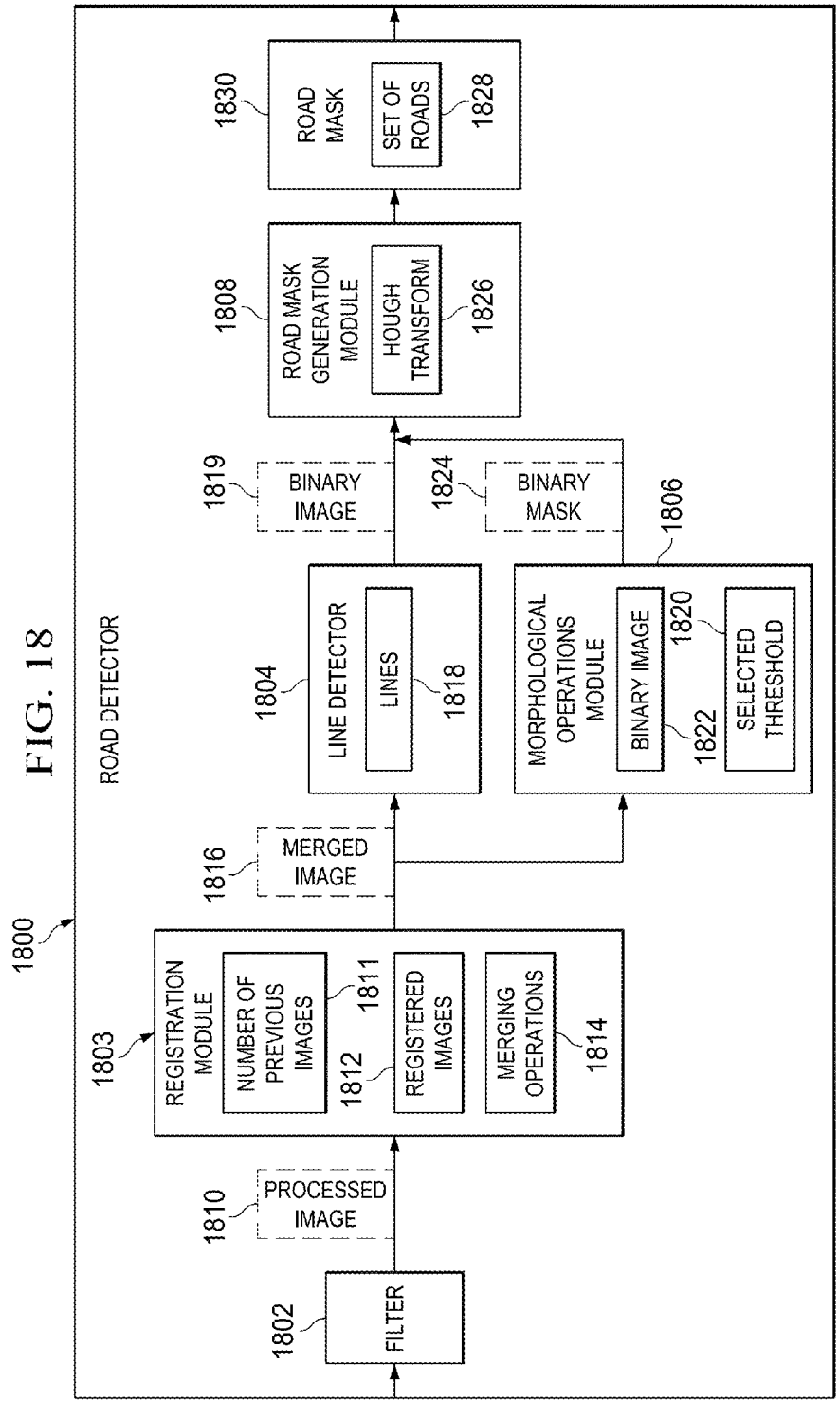
FIG. 18 is an illustration of a road detector in accordance with an advantageous embodiment.

With reference now to FIG. 18, an illustration of a road detector is depicted in accordance with an advantageous embodiment. Road detector 1800 may be implemented in context recognition module 234 in FIG. 2. In particular, road detector 1800 is configured to identify roads that may be present in image 228 in FIG. 2. Roads that are identified may form a portion of group of objects 236 in FIG. 2.

As depicted, road detector 1800 includes filter 1802, registration module 1803, line detector 1804, morphological operations module 1806, and Hough transform 1826. Filter 1802 is configured to reduce noise in the form of speckle noise from image 228 to form processed image 1810. Of course, filter 1802 may be configured to reduce other types of noise in addition to and/or in place of speckle noise.

Registration module 1803 is configured to receive processed image 1810. Registration module 1803 registers number of previous images 1811 with processed image 1810 to form registered images 1812. Number of previous images 1811 includes one or more previously filtered synthetic aperture radar images. Registered images 1812 are number of previous images 1811 aligned with and overlaid over processed image 1810.

Further, registration module 1803 performs merging operations 1814 to form merged image 1816 using registered images 1812. Merging operations 1814 include selecting the maximum value of corresponding pixels in registered images 1812 as the value for the corresponding pixels in merged image 1816.

Shadows may have a level of intensity similar to roads. However, shadows cast by objects, such as buildings, structures, vegetation, and/or other types of objects, may be in different locations and/or have different sizes in registered images when the images are generated from different viewpoints and/or by different camera systems. As a result, a pixel for a shadow cast by an object, such as a building, in processed image 1810 may correspond to a pixel in another image in registered images 1812 that is not for the same shadow.

Further, lines that may be identified for roads may be in substantially the same locations in registered images. In this manner, a pixel for a road in processed image 1810 may correspond to a pixel for the same road in the other images in registered images 1812.

In this manner, merging operations 1814 reduces the presence of undesired shadows and/or other features that may cause a false identification of roads.

Merged image 1816 is sent to both line detector 1804 and morphological operations module 1806. Line detector 1804 is configured to detect lines 1818. Line detector 1804 may be implemented using the algorithm developed by Carsten Steger, which is similar to line detector 304 in FIG. 3. However, in these illustrative examples, lines 1818 are dark lines. In this illustrative example, line detector 1804 generates binary image 1819. In binary image 1819, pixels corresponding to lines 1818 have a value of "1".

Morphological operations module 1806 applies selected threshold 1820 to merged image 1816 to generate binary image 1822. In this illustrative example, selected threshold 1820 may be a low level of intensity for the pixels in merged image 1816. In particular, a pixel in binary image 1822 has a value of "1" when the corresponding pixel in merged image 1816 has a value less than selected threshold 1820.

Additionally, morphological operations module 1806 is configured to process binary image 1822 using morphological image processing to form binary mask 1824. Morphological image processing may include morphological operations, such as, for example, without limitation, blob analysis, erosion, dilation, opening, closing, and/or other suitable types of morphological operations. Binary mask 1824 may be white areas in which pixels have a value of "1". These white areas are areas that may potentially be roads.

Road mask generation module 1808 is configured to apply binary mask 1824 to binary image 1819 to identify which of lines 1818 are in the white areas of binary mask 1824. Road mask generation module 1808 uses Hough transform 1826 to identify which of the lines in the white areas of binary mask 1824 may be for roads. In particular, Hough transform 1826 is used to identify set of roads 1828 based on which of the lines in the wire areas of binary mask 1824 are substantially straight lines for roads. Based on the results of Hough transform 1826, road mask generation module 1808 generates road mask 1830 identifying set of roads 1828.

Figure 19:
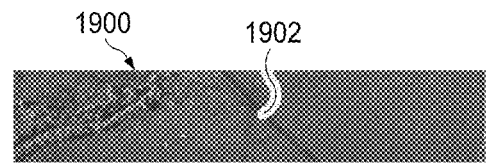
FIG. 19 is an illustration of an image generated using a synthetic aperture radar imaging system in accordance with an advantageous embodiment.

With reference now to FIG. 19, an illustration of an image generated using a synthetic aperture radar imaging system is depicted in accordance with an advantageous embodiment. In this illustrative example, image 1900 may be generated using a synthetic aperture radar imaging system, such as synthetic aperture radar imaging system 212 in FIG. 2. As depicted, road 1902 is present in image 1900.

Figure 20:
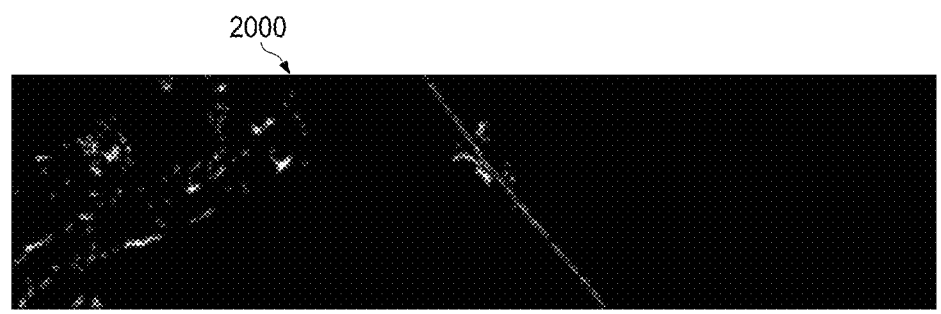
FIG. 20 is an illustration of a processed image for use in identifying roads in accordance with an advantageous embodiment.

Turning now to FIG. 20, an illustration of a processed image for use in identifying roads is depicted in accordance with an advantageous embodiment. In this illustrative example, binary image 2000 may be generated using a road detector, such as road detector 1800 in FIG. 18. In particular, binary image 2000 is an example of one implementation for binary image 1819 in FIG. 18.

Figure 21:
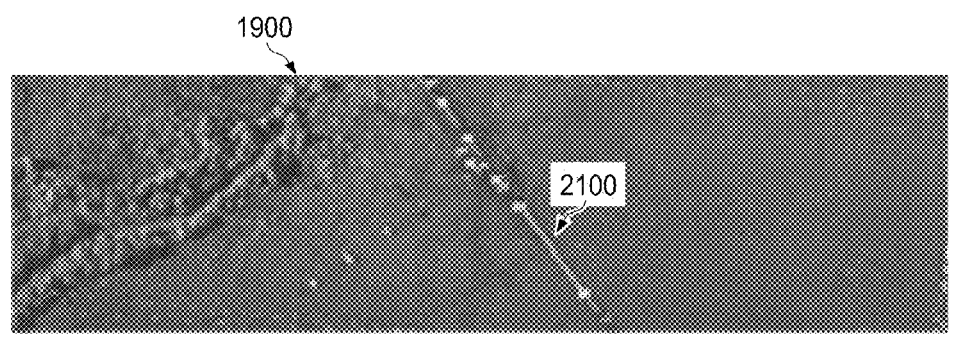
FIG. 21 is an illustration of a road mask for an image in accordance with an advantageous embodiment.

With reference now to FIG. 21, an illustration of a road mask for an image is depicted in accordance with an advantageous embodiment. In this illustrative example, road mask 2100 may be generated by a road detector, such as road detector 1800 in FIG. 18. Road mask 2100 is overlaid on image 1900 from FIG. 19.

With reference now to FIG. 22, an illustration of a flowchart of a process for identifying a target object is depicted in accordance with an advantageous embodiment. The process illustrated in FIG. 22 may be implemented using image processing module 210 in FIG. 2.

The process begins by receiving an image (operation 2200). The image received may have been generated using, for example, synthetic aperture radar imaging system 212 in FIG. 2. The process then preprocesses the image to reduce noise in the image (operation 2202). In operation 2202, the image may be preprocessed to reduce noise in the form of speckle noise in this illustrative example.

Next, the process identifies a group of objects in the image (operation 2204). The group of objects provides a context for identifying the target object. The group of objects may include, for example, buildings, roads, vegetation, and/or other objects. The process then identifies a number of regions in the image to search for the target object based on the context from the group of objects (operation 2206). Thereafter, the process searches for the target object in the image using the context provided by the group of objects (operation 2208), with the process terminating thereafter.

Figure 23:
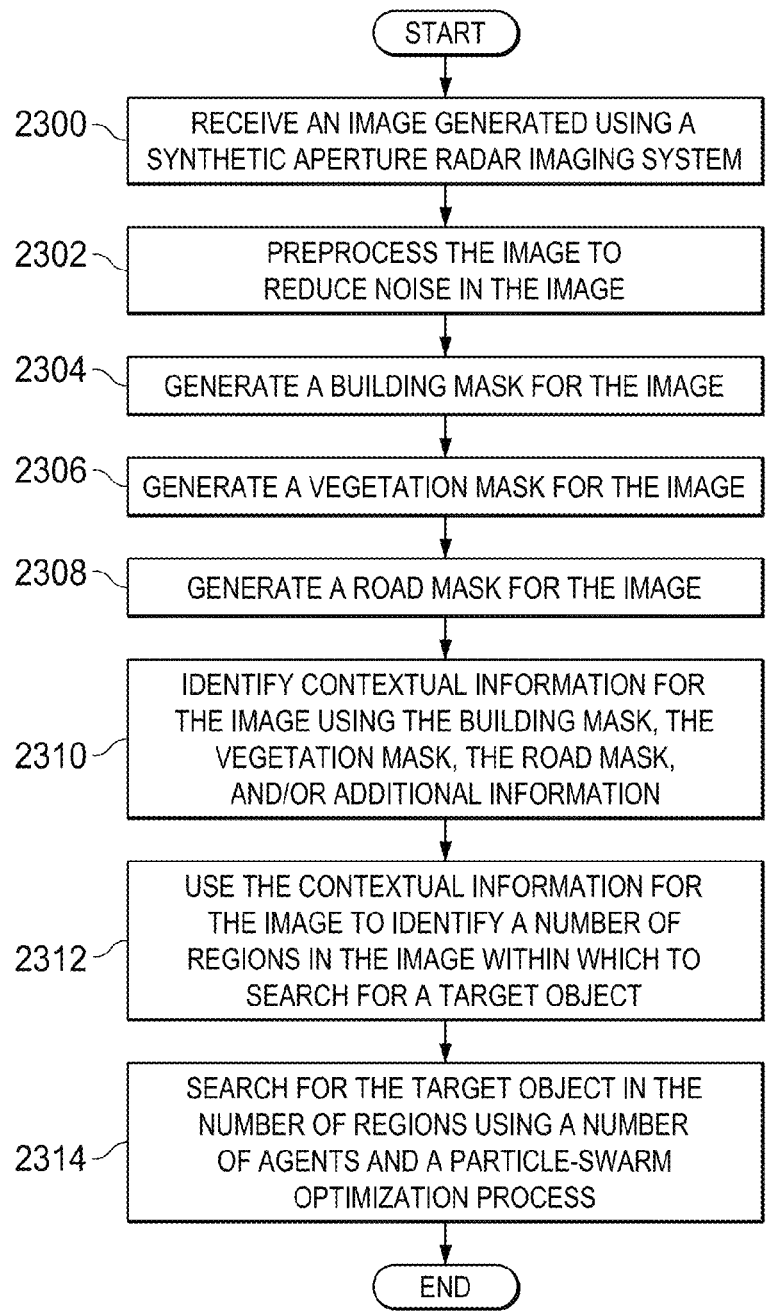
FIG. 23 is an illustration of a flowchart of a process for identifying a target object in an image in accordance with an advantageous embodiment.

With reference now to FIG. 23, an illustration of a process for identifying a target object in an image is depicted in accordance with an advantageous embodiment. The process illustrated in FIG. 23 may be implemented using image processing module 210 in FIG. 2. Further, this process may be a more-detailed process of the process illustrated in FIG. 22.

The process begins by receiving an image generated using a synthetic aperture radar imaging system (operation 2300). The process then preprocesses the image to reduce noise in the image (operation 2302). Next, the process generates a building mask for the image (operation 2304). The process then generates a vegetation mask for the image (operation 2306). Then, the process generates a road mask for the image (operation 2308).

Thereafter, the process identifies contextual information for the image using the building mask, the vegetation mask, the road mask, and/or additional information (operation 2310). The additional information may include, for example, weather data, traffic data, geographical information, maps, satellite images, mission details, and/or other suitable types of information.

Next, the process uses the contextual information for the image to identify a number of regions in the image within which to search for a target object (operation 2312). A region in the number of regions may be, for example, within a selected distance from one or more of the building mask, the vegetation mask, and the road mask. In some illustrative examples, a region may be within the road mask when the target object is a vehicle traveling on a road.

The process then searches for the target object in the number of regions using a number of agents and a particle-swarm optimization process (operation 2314), with the process terminating thereafter. In operation 2314, each agent in the number of agents searches for the target object within a window for the agent.

With reference now to FIG. 24, an illustration of a process for detecting buildings in an image is depicted in accordance with an advantageous embodiment. The process illustrated in FIG. 24 may be implemented using, for example, building detector 300 in FIG. 3. Further, this process may be used to implement operation 2304 in FIG. 23.

The process begins by identifying a set of lines in an image (operation 2400). In operation 2400, the image is a processed image. In particular, the processed image has been processed to substantially remove noise, such as speckle noise, from the image.

The process then identifies a set of bright areas in the image (operation 2402). Next, the process identifies a set of shadows in the image (operation 2404). Thereafter, the process identifies a set of buildings in the image using the set of lines, the set of bright areas, and the set of shadows (operation 2406). The process generates a building mask for the image that identifies the set of buildings and locations for the set of buildings in the image (operation 2408), with the process terminating thereafter.

Figure 25:
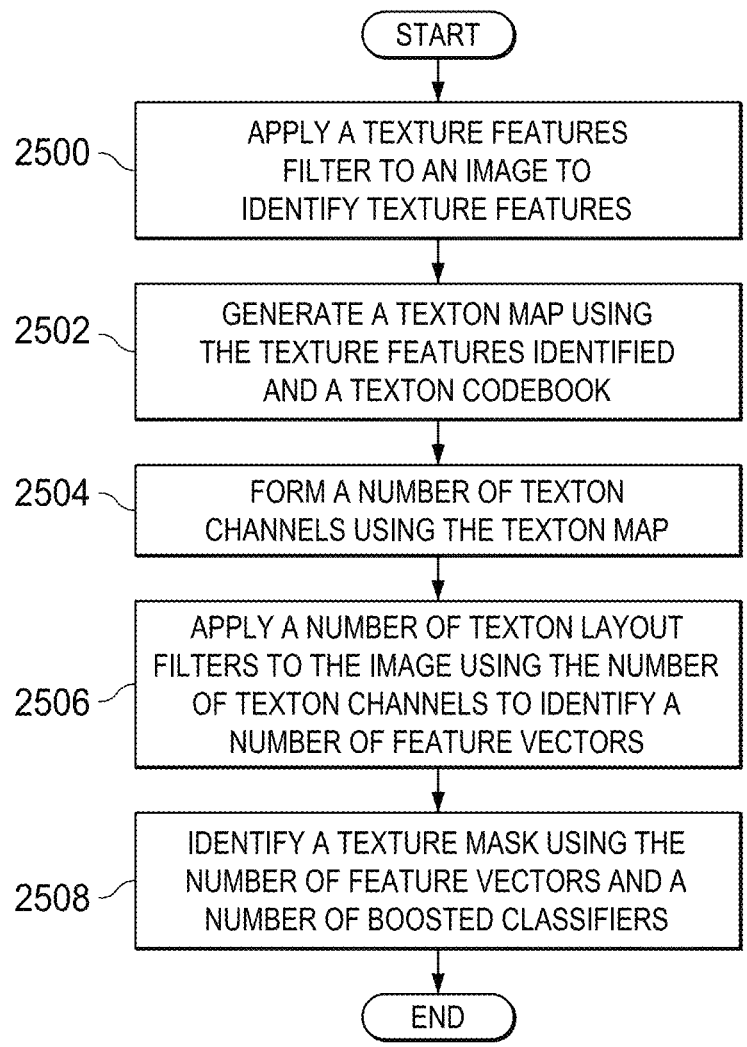
FIG. 25 is an illustration of a flowchart of a process for detecting vegetation in an image in accordance with an advantageous embodiment.

With reference now to FIG. 25, an illustration of a flowchart of a process for detecting vegetation in an image is depicted in accordance with an advantageous embodiment. The process illustrated in FIG. 25 may be implemented using, for example, vegetation detector 1400 in FIG. 14. Further, this process may be used to implement operation 2306 in FIG. 23.

The process begins by applying a texture features filter to an image to identify texture features (operation 2500). The process then generates a texton map using the texture features identified and a texton codebook (operation 2502). Next, the process forms a number of texton channels using the texton map (operation 2504).

The process applies a number of texton layout filters to the image using the number of texton channels to identify a number of feature vectors (operation 2506). Thereafter, the process identifies a texture mask using the number of feature vectors and a number of boosted classifiers (operation 2508), with the process terminating thereafter.

Figure 26:
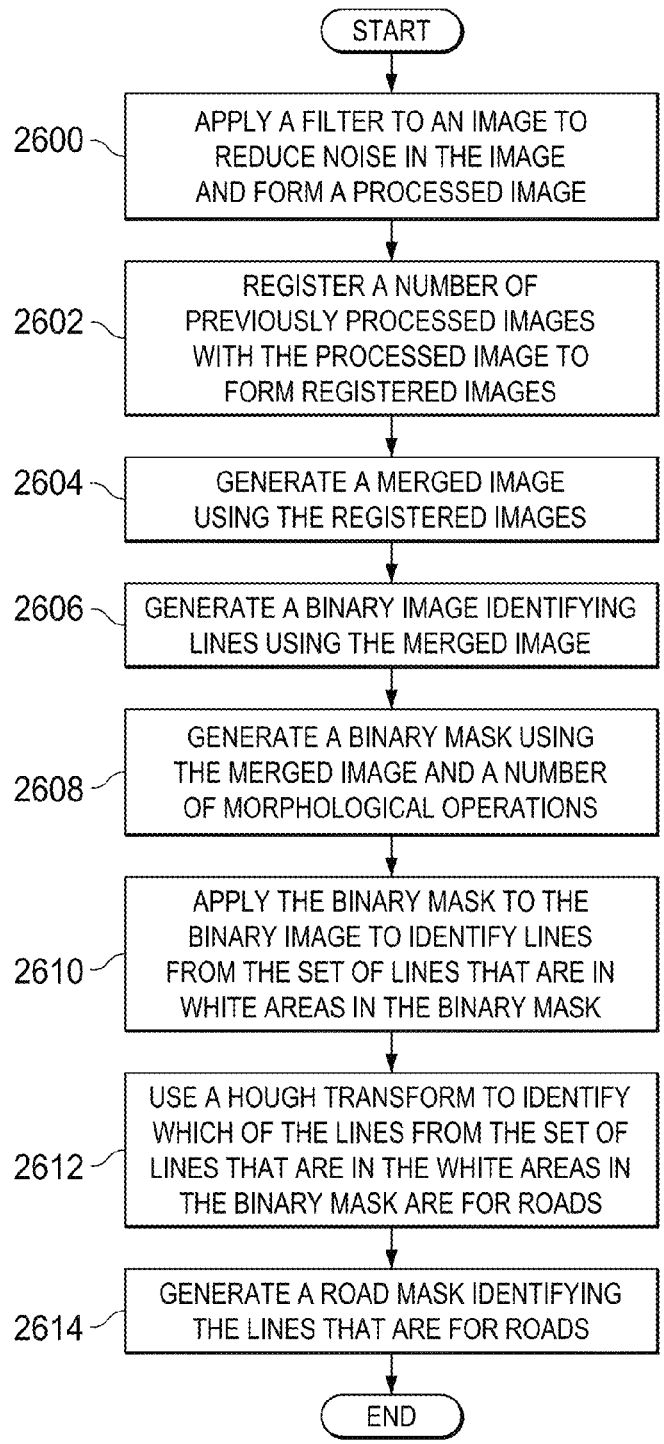
FIG. 26 is an illustration of a flowchart of a process for detecting roads in an image in accordance with an advantageous embodiment.

With reference now to FIG. 26, an illustration of a flowchart of a process for detecting roads in an image is depicted in accordance with an advantageous embodiment. The process illustrated in FIG. 26 may be implemented using, for example, road detector 1800 in FIG. 18.

The process begins by applying a filter to an image to reduce noise in the image and form a processed image (operation 2600). The noise may be in the form of, for example, speckle noise. The process registers a number of previously processed images with the processed image to form registered images (operation 2602). The process generates a merged image using the registered images (operation 2604).

Thereafter, the process generates a binary image identifying lines using the merged image (operation 2606). These lines represent the dark lines from the processed image. The process generates a binary mask using the merged image and a number of morphological operations (operation 2608). Next, the process applies the binary mask to the binary image to identify lines from the set of lines that are in white areas in the binary mask (operation 2610).

The process then uses a Hough transform to identify which of the lines from the set of lines that are in the white areas in the binary mask are for roads (operation 2612). Thereafter, the process generates a road mask identifying the lines that are for roads (operation 2614), with the process terminating thereafter.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 27, an illustration of a data processing system is depicted in accordance with an advantageous embodiment. In this illustrative example, data processing system 2700 may be used to implement one or more of number of computers 231 in FIG. 2. Data processing system 2700 includes communications fabric 2702, which provides communications between processor unit 2704, memory 2706, persistent storage 2708, communications unit 2710, input/output (I/O) unit 2712, and display 2714.

Processor unit 2704 serves to execute instructions for software that may be loaded into memory 2706. Processor unit 2704 may be a number of processors, a multi-processor core, or some other type of processor, depending on the particular implementation. A number, as used herein with reference to an item, means one or more items. Further, processor unit 2704 may be implemented using a number of heterogeneous processor systems in which a main processor is present with secondary processors on a single chip. As another illustrative example, processor unit 2704 may be a symmetric multi-processor system containing multiple processors of the same type.

Memory 2706 and persistent storage 2708 are examples of storage devices 2716. A storage device is any piece of hardware that is capable of storing information, such as, for example, without limitation, data, program code in functional form, and/or other suitable information either on a temporary basis and/or a permanent basis. Storage devices 2716 may also be referred to as computer readable storage devices in these examples. Memory 2706, in these examples, may be, for example, a random access memory or any other suitable volatile or non-volatile storage device. Persistent storage 2708 may take various forms, depending on the particular implementation.

For example, persistent storage 2708 may contain one or more components or devices. For example, persistent storage 2708 may be a hard drive, a flash memory, a rewritable optical disk, a rewritable magnetic tape, or some combination of the above. The media used by persistent storage 2708 also may be removable. For example, a removable hard drive may be used for persistent storage 2708.

Communications unit 2710, in these examples, provides for communications with other data processing systems or devices. In these examples, communications unit 2710 is a network interface card. Communications unit 2710 may provide communications through the use of either or both physical and wireless communications links.

Input/output unit 2712 allows for input and output of data with other devices that may be connected to data processing system 2700. For example, input/output unit 2712 may provide a connection for user input through a keyboard, a mouse, and/or some other suitable input device. Further, input/output unit 2712 may send output to a printer. Display 2714 provides a mechanism to display information to a user.

Instructions for the operating system, applications, and/or programs may be located in storage devices 2716, which are in communication with processor unit 2704 through communications fabric 2702. In these illustrative examples, the instructions are in a functional form on persistent storage 2708. These instructions may be loaded into memory 2706 for execution by processor unit 2704. The processes of the different embodiments may be performed by processor unit 2704 using computer-implemented instructions, which may be located in a memory, such as memory 2706.

These instructions are referred to as program code, computer usable program code, or computer readable program code that may be read and executed by a processor in processor unit 2704. The program code in the different embodiments may be embodied on different physical or computer readable storage media, such as memory 2706 or persistent storage 2708.

Program code 2718 is located in a functional form on computer readable media 2720 that is selectively removable and may be loaded onto or transferred to data processing system 2700 for execution by processor unit 2704. Program code 2718 and computer readable media 2720 form computer program product 2722 in these examples. In one example, computer readable media 2720 may be computer readable storage media 2724 or computer readable signal media 2726. Computer readable storage media 2724 may include, for example, an optical or magnetic disk that is inserted or placed into a drive or other device that is part of persistent storage 2708 for transfer onto a storage device, such as a hard drive, that is part of persistent storage 2708.

Computer readable storage media 2724 also may take the form of a persistent storage, such as a hard drive, a thumb drive, or a flash memory, that is connected to data processing system 2700. In some instances, computer readable storage media 2724 may not be removable from data processing system 2700. In these examples, computer readable storage media 2724 is a physical or tangible storage device used to store program code 2718 rather than a medium that propagates or transmits program code 2718. Computer readable storage media 2724 is also referred to as a computer readable tangible storage device or a computer readable physical storage device. In other words, computer readable storage media 2724 is a media that can be touched by a person.

Alternatively, program code 2718 may be transferred to data processing system 2700 using computer readable signal media 2726. Computer readable signal media 2726 may be, for example, a propagated data signal containing program code 2718. For example, computer readable signal media 2726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 2718 may be downloaded over a network to persistent storage 2708 from another device or data processing system through computer readable signal media 2726 for use within data processing system 2700. For instance, program code stored in a computer readable storage medium in a server data processing system may be downloaded over a network from the server to data processing system 2700. The data processing system providing program code 2718 may be a server computer, a client computer, or some other device capable of storing and transmitting program code 2718.

The different components illustrated for data processing system 2700 are not meant to provide architectural limitations to the manner in which different embodiments may be implemented. The different advantageous embodiments may be implemented in a data processing system including components in addition to or in place of those illustrated for data processing system 2700. Other components shown in FIG. 27 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2704 may take the form of a hardware unit that has circuits that are manufactured or configured for a particular use. This type of hardware may perform operations without needing program code to be loaded into a memory from a storage device to be configured to perform the operations.

For example, when processor unit 2704 takes the form of a hardware unit, processor unit 2704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 2718 may be omitted because the processes for the different embodiments are implemented in a hardware unit.

In still another illustrative example, processor unit 2704 may be implemented using a combination of processors found in computers and hardware units. Processor unit 2704 may have a number of hardware units and a number of processors that are configured to run program code 2718. With this depicted example, some of the processes may be implemented in the number of hardware units, while other processes may be implemented in the number of processors.

In another example, a bus system may be used to implement communications fabric 2702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 2706, or a cache, such as found in an interface and memory controller hub that may be present in communications fabric 2702.

Thus, the different advantageous embodiments provide a method and apparatus for identifying a target object in an image. In particular, a method and apparatus for identifying a target object in an image using contextual information identified in the image is provided. In one advantageous embodiment, a group of objects are identified in an image. The group of objects provides a context for identifying a target object in the image. The image is then searched for the target object using the context provided by the group of objects.

In this manner, the different advantageous embodiments provide a system for identifying target objects more rapidly and/or accurately than currently-available systems. Additionally, the amount of computing resources needed to identify target objects in images may be reduced. Further, the time and/or effort spent by an operator identifying which identifications of target objects are false identifications may be reduced.

The description of the different advantageous embodiments has been presented for purposes of illustration and description and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a target object comprising at least one of a road and a building from an image taken using synthetic aperture radar (SAR) data, the method comprising:
    generating a mask by:
        selecting, using the processor, a first threshold and a second threshold of a plurality of thresholds based on a cumulative histogram for the image, wherein the cumulative histogram plots a level of intensity versus a cumulative percentage of pixels in the image;
        selecting, using the processor, a percentage using the cumulative histogram, the percentage being the percentage of pixels that are to be included in a process for identifying a set of bright areas and a number of shadow areas;
        using an area detector, executed by the processor, to identify the set of bright areas and the number of shadow areas in the image using the plurality of thresholds, including the first threshold and the second threshold;
        identifying bright areas by applying the plurality of thresholds, including the first threshold, to the image to identify a number of binary images in which each pixel in a given binary image has a first set of two values, either a first value indicating that a first intensity for that pixel is less than the first threshold or a second value that indicates that a second intensity for that pixel is greater than the first threshold, wherein the bright areas are pixels that are above the first threshold;
        identifying number shadow areas by applying the plurality of thresholds, including the second threshold in the plurality of thresholds, to the image to identify a second number of binary images in which each pixel in a given binary image has a second set of two values, either a third value indicating that the first intensity for that pixel is less than the second threshold or a fourth value that indicates that the second intensity for that pixel is greater than the second threshold, wherein the shadow areas are pixels that are below the second threshold, and wherein the first threshold is greater than the second threshold;
        wherein generating the mask is performed by processing the bright areas and the shadow areas to identify which objects in the image may be the target object;
    searching, by the processor and using the mask, for the target object within the number of regions.

2. The method of claim 1, wherein searching for the target object in the image further comprises:
    responsive to identifying a particular object in the image as the target object, determining whether the particular object is the target object based on a location of the particular object to a group of objects.

3. The method of claim 2, wherein searching for the target further comprises:

searching for the target object in the image using a context provided by the group of objects with a number of agents, wherein an agent in the number of agents is configured to search for the target object within a window for the agent.

4. The method of claim 3, wherein searching for the target object in the image using the context provided by the group of objects comprises:
    searching for the target object in the image in a number of regions in the image using a particle-swarm optimization process, wherein the number of regions is identified using the context provided by the group of objects.

5. The method of claim 1, wherein generating the mask further comprises:
    identifying a set of lines in the image and processing the set of lines along with the bright areas and the shadow areas.

6. The method of claim 1 wherein generating the mask further comprises:
    prior to selecting the first and second thresholds, processing the SAR data to reduce noise present in the image.

7. An apparatus for identifying a target object comprising at least one of a road and a building from an image taken using synthetic aperture radar (SAR) data, the apparatus comprising:
    a processor configured to generate a mask, the processor being specifically configured to:
        select, using the processor, a first threshold and a second threshold of a plurality of thresholds based on a cumulative histogram for the image, wherein the cumulative histogram plots a level of intensity versus a cumulative percentage of pixels in the image;
        select, using the processor, a percentage using the cumulative histogram, the percentage being the percentage of pixels that are to be included in a process for identifying a set of bright areas and a number of shadow areas;
        use an area detector, executed by the processor, to identify the set of bright areas and the number of shadow areas in the image using the plurality of thresholds, including the first threshold and the second threshold;
        identify bright areas by applying the plurality of thresholds, including the first threshold, to the image to identify a number of binary images in which each pixel in a given binary image has a first set of two values, either a first value indicating that a first intensity for that pixel is less than the first threshold or a second value that indicates that a second intensity for that pixel is greater than the first threshold, wherein the bright areas are pixels that are above the first threshold;
        identify number shadow areas by applying the plurality of thresholds, including the second threshold in the plurality of thresholds, to the image to identify a second number of binary images in which each pixel in a given binary image has a second set of two values, either a third value indicating that the first intensity for that pixel is less than the second threshold or a fourth value that indicates that the second intensity for that pixel is greater than the second threshold, wherein the shadow areas are pixels that are below the second threshold, and wherein the first threshold is greater than the second threshold;
        wherein generating the mask is performed by processing the bright areas and the shadow areas to identify which objects in the image may be the target object;
    the processor further configured to search, using the mask, for the target object within the number of regions.

8. The method of claim 1 further comprising:
prior to identifying the group of objects, preprocessing the image to reduce noise in the image.

9. The method of claim 1, wherein the context further includes additional information obtained from sources other than the image.

10. The method of claim 9, wherein the additional information is selected from the group consisting of: intelligence information, mission details, and weather data.

11. The method of claim 1, wherein the number of masks is selected from the group consisting of a building mask, a vegetation mask, and a road mask.

12. The method of claim 11, wherein the number of masks comprises all of the building mask, the vegetation mask, and the road mask.

13. The method of claim 1, wherein the plurality of thresholds is a plurality of thresholds, and wherein other thresholds within the plurality of thresholds are selected by substantially equally dividing an interval between the first threshold and a highest level of intensity in the image by a total of the plurality of thresholds.

* * * * *